United States Patent
Kurihara et al.

(10) Patent No.: US 8,293,165 B2
(45) Date of Patent: Oct. 23, 2012

(54) RESIN FORMING METHOD AND RESIN FORMING APPARATUS

(75) Inventors: Fumio Kurihara, Tokyo (JP); Masamitsu Takami, Tokyo (JP); Koichi Abe, Tokyo (JP); Shinichi Iso, Tokyo (JP)

(73) Assignees: Techno Polymer Co., Ltd., Tokyo (JP); Nihon Rex Co., Ltd., Tokyo (JP)

( * ) Notice: Subject to any disclaimer, the term of this patent is extended or adjusted under 35 U.S.C. 154(b) by 333 days.

(21) Appl. No.: 12/092,828

(22) PCT Filed: Nov. 15, 2006

(86) PCT No.: PCT/JP2006/322703
§ 371 (c)(1),
(2), (4) Date: Jul. 9, 2008

(87) PCT Pub. No.: WO2007/058184
PCT Pub. Date: May 24, 2007

(65) Prior Publication Data
US 2009/0224433 A1    Sep. 10, 2009

(30) Foreign Application Priority Data

| Nov. 15, 2005 | (JP) | 2005-330672 |
| Feb. 15, 2006 | (JP) | 2006-037674 |
| Feb. 15, 2006 | (JP) | 2006-037675 |
| Jul. 10, 2006 | (JP) | 2006-189411 |
| Aug. 18, 2006 | (JP) | 2006-223352 |

(51) Int. Cl.
*B29C 35/08* (2006.01)

(52) U.S. Cl. ........ 264/496; 264/405; 264/492; 264/494; 219/411

(58) Field of Classification Search ............... 264/496, 264/405, 492, 494; 219/411
See application file for complete search history.

(56) References Cited

U.S. PATENT DOCUMENTS

| 4,908,169 | A | * | 3/1990 | Galic et al. | 264/410 |
| 5,094,010 | A | * | 3/1992 | Jacobi et al. | 34/278 |

(Continued)

FOREIGN PATENT DOCUMENTS

JP    2 4503    1/1990

(Continued)

OTHER PUBLICATIONS

M. W. Davidson, ZEISS Online Camups, Tungsten-Halogen Lamps, http://zeiss-campus.magnet.fsu.edu/articles/lightsources/tungstenhalogen.html.*

(Continued)

*Primary Examiner* — Richard Crispino
*Assistant Examiner* — Elizabeth Royston
(74) *Attorney, Agent, or Firm* — Oblon, Spivak, McClelland, Maier & Neustadt, L.L.P.

(57) ABSTRACT

A resin forming method and a resin forming apparatus for obtaining a resin formed product, by filling a cavity of a rubber-made mold with a thermoplastic resin, and cooling the thermoplastic resin. When filling the cavity with the thermoplastic resin, an electromagnetic wave generator is used, and electromagnetic waves having an intensity peak in a wavelength region of 0.78 to 2 μm are irradiated to the thermoplastic resin from the surface of the mold, and thereby the thermoplastic resin is heated selectively from the mold. The thermoplastic resin is an ABS resin which either a noncrystalline thermoplastic resin, or is a rubber modified thermoplastic resin.

16 Claims, 24 Drawing Sheets

U.S. PATENT DOCUMENTS

| | | | |
|---|---|---|---|
| 5,399,637 A * | 3/1995 | Willett et al. | 526/142 |
| 5,496,903 A * | 3/1996 | Watanabe et al. | 526/204 |
| 5,855,837 A * | 1/1999 | Scranton et al. | 264/494 |
| 6,017,973 A * | 1/2000 | Tamura et al. | 522/96 |
| 2001/0031594 A1 * | 10/2001 | Perez et al. | 442/339 |
| 2002/0089097 A1 | 7/2002 | Silverbrook | |
| 2004/0264359 A1 * | 12/2004 | Hayashi et al. | 369/275.4 |
| 2005/0123743 A1 * | 6/2005 | Martinazzo | 428/328 |
| 2005/0244614 A1 | 11/2005 | Bharadwaj et al. | |

FOREIGN PATENT DOCUMENTS

| | | |
|---|---|---|
| JP | 7 178754 | 7/1995 |
| JP | 10 193370 | 7/1998 |
| JP | 2002 59468 | 2/2002 |
| JP | 2002 273764 | 9/2002 |
| JP | 2004 90326 | 3/2004 |

OTHER PUBLICATIONS http://www.imotoss.net/product/molding/Photo_molding.html, accessed Jun. 14, 2012.* http://www.imotoss.net/product/molding/Photo_Molding.pdf, accessed Jun. 14, 2012.*

U.S. Appl. No. 12/935,828, filed Sep. 30, 2010, Kurihara, et al.

* cited by examiner

RESIN FORMING METHOD AND RESIN FORMING APPARATUS

TECHNICAL FIELD

The present invention relates to a resin forming method and a resin forming apparatus for obtaining a resin formed product from a thermoplastic resin.

BACKGROUND ART

A thermoplastic resin is formed by various methods, and is used as a formed product. Various forming methods are practically realized depending on the crystallinity, amorphous property, or melt viscosity, or shape of formed product, including injection forming, blow forming, extrusion forming, and press forming.

Depending on the type of the thermoplastic resin or the shape of formed products, the temperature of the thermoplastic resin may drop in the forming process, and the melt viscosity rises, and the desired formed product may not be obtained. As an improving method, it is proposed to heat the forming mold for forming a formed product by a heater or the like.

For example, in the resin forming method disclosed in patent document 1, the melted thermoplastic resin is cast into a cavity of a mold made of silicone rubber, and the thermoplastic resin is cooled, and a formed product is obtained. In order to obtain a resin formed product excellent in surface precision and surface gloss easily, the composition of the mold made of silicone rubber is modified.

In the conventional resin forming method, however, especially in an end portion of the cavity to be filled with the thermoplastic resin, the temperature of the thermoplastic resin to be formed is likely to decline, and the viscosity of the thermoplastic resin may be raised. In such a case, in the cavity of the mold, insufficient filling with the thermoplastic resin may occur.

In patent document 1, meanwhile, the heat resisting temperature of silicone rubber is about 200° C., and if the heating temperature by the heater or the like is raised in order to prevent decline of temperature of the resin, the mold of silicone rubber deteriorates, and the surface appearance of the formed product formed from this mold may be poor.

For example, in the manufacturing method and its apparatus of a resin formed product disclosed in patent document 2, in the process of obtaining a formed product by charging a granular or powder metal aggregate and the thermoplastic resin in a mold frame, metal heating means is used for heating the metal aggregate locally. In this manufacturing method, from the metal heating means, microwaves or electromagnetic waves are irradiated to the metal aggregate in the mold frame, and the metal aggregate is heated, and the generated heat from the metal aggregate is utilized for softening or melting the thermoplastic resin in the mold frame, and the resin formed product is pressed and formed.

However, the technology in patent document 2 is a technology of heating the metal aggregate selectively, not heating the thermoplastic resin itself. Further, by the metal heating means, the mold frame is also heated when heating the metal aggregate. Therefore, the thermoplastic resin only cannot be heated selectively without heating the mold frame substantially.

For example, patent document 3 discloses a forming method of filling with the thermoplastic resin by vacuum injection method.

Patent document 1: JP 7-178754 Examined Patent Publication (Kokoku)
Patent document 2: JP 10-193370 Examined Patent Publication (Kokoku)
Patent document 3: JP 2002-59468 Examined Patent Publication (Kokoku)

DISCLOSURE OF THE INVENTION

Problems to be Solved by the Invention

The present invention has been accomplished in view of the conventional problems, and its object is to provide a resin forming method and a resin forming apparatus capable of heating selectively a thermoplastic resin in a cavity of a rubber-made mold, and obtaining a favorable resin formed product.

Means for Solving the Problems

A first aspect of the present invention relates to a resin forming method for obtaining a resin formed product by filling a cavity of a rubber-made mold with a thermoplastic resin and cooling the thermoplastic resin, wherein the thermoplastic resin is heated by irradiating electromagnetic waves of 0.78 to 2 μm in wavelength to the thermoplastic resin from the surface of the mold when filling the cavity with the thermoplastic resin.

In the resin forming method of the present invention, by using the rubber-made mold, when forming a resin formed product made of a thermoplastic resin, the thermoplastic resin in the mold can be heated selectively to the mold.

That is, when forming a resin formed product, the cavity of the rubber-made mold is filled with the thermoplastic resin. In this filling process, an electromagnetic wave of wavelength of 0.78 to 2 μm (hereinafter it may be called near-infrared ray of wavelength of 2 μm or less) is irradiated to the thermoplastic resin from the surface of the mold. At this time, due to difference in properties between the rubber of the mold and the thermoplastic resin, the thermoplastic resin may be heated more than the mold made of rubber.

As a result, until the cavity is fully filled with the thermoplastic resin, the temperature of the thermoplastic resin in the cavity may be kept higher than the temperature of the mold.

Hence, according to the resin molding method of the present invention, the thermoplastic resin in the cavity may be heated selectively from the rubber-made mold, and insufficient filling of the cavity with the thermoplastic resin may be prevented, and a favorable resin formed product is obtained.

By the near-infrared ray of wavelength of 2 μm or less, as compared with the rubber-made mold, the thermoplastic resin may be heated selectively, and its reason may be considered as follows.

That is, the near-infrared ray of wavelength of 2 μm or less irradiated to the surface of the rubber-made mold is mostly reflected on the surface of the mold or passed through the mold, but is mostly absorbed in the thermoplastic resin. Accordingly, it is considered that the energy of the light of the near-infrared ray of wavelength of 2 μm or less is preferentially absorbed by the thermoplastic resin, so that the thermoplastic resin is heated selectively.

A second aspect of the present invention relates to a resin forming apparatus including a rubber-made mold having a cavity to be filled with a thermoplastic resin, and electromagnetic wave generating means for heating the thermoplastic resin by irradiating electromagnetic waves of 0.78 to 2 μm in wavelength to the thermoplastic resin from the surface of the mold, when filling the cavity with the thermoplastic resin.

The resin forming apparatus of the present invention is an apparatus for forming a resin formed product composed of a thermoplastic resin by using a rubber-made mold, and also capable of heating the thermoplastic resin in the mold selectively.

That is, the resin forming apparatus of the present invention has the rubber-made mold, and the electromagnetic wave generating means for irradiating an electromagnetic wave in a wavelength of 0.78 to 2 μm. When filling the cavity of the rubber-made mold with thermoplastic resin, a near-infrared ray of wavelength of 2 μm or less is irradiated to the thermoplastic resin from the surface of the mold by means of the electromagnetic wave generating means. At this time, due to difference in properties between the rubber of the mold and the thermoplastic resin, the thermoplastic resin may be heated more than the mold made of rubber.

As a result, until the cavity is fully filled with the thermoplastic resin, the temperature of the thermoplastic resin in the cavity is kept higher than the temperature of the mold.

Hence, according to the resin forming apparatus of the present invention, the thermoplastic resin in the cavity is heated selectively from the rubber-made mold, and defective filling of the cavity with the thermoplastic resin is prevented, and a favorable resin formed product may be obtained.

The reason is assumed the same as in the first aspect of the present invention that the thermoplastic resin may be heated selectively by means of the near-infrared ray of wavelength of 2 μm or less as compared with the rubber-made mold.

BEST MODE FOR CARRYING OUT THE INVENTION

Figure 1:
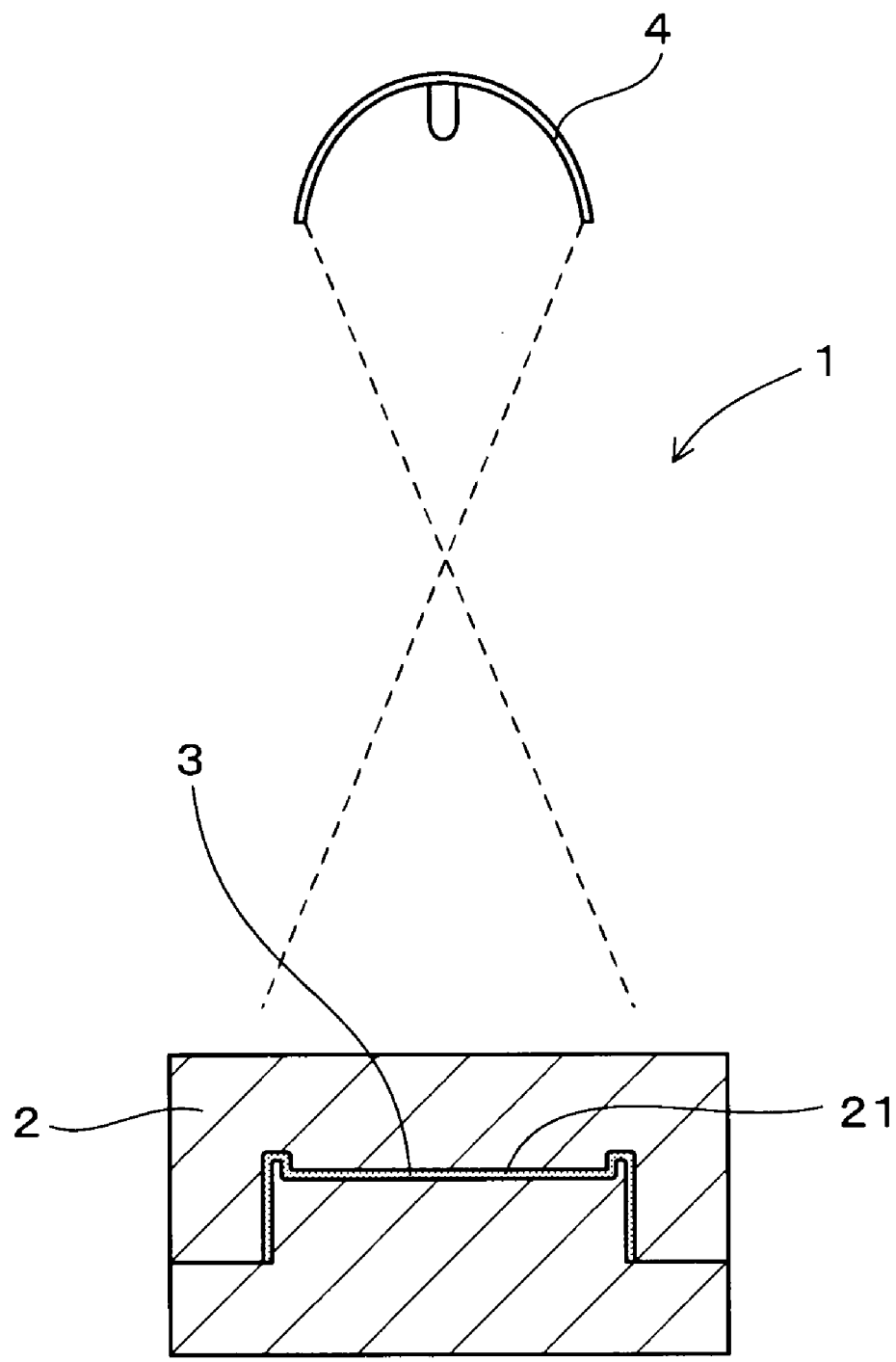
FIG. 1 is an explanatory diagram of a resin forming apparatus in embodiment 1.

Preferred embodiments of the first and second aspects of the present invention are specifically described below.

In the first and second aspects of the present invention, the electromagnetic wave to be irradiated to the thermoplastic resin through the mold is not limited to electromagnetic waves in a waveform range of 0.78 to 2 μm, but may include electromagnetic waves in other range. In such a case, the electromagnetic wave or transmission electromagnetic wave to be irradiated to the thermoplastic resin through the mold preferably contains electromagnetic waves in a wavelength range of 0.78 to 2 μm more than electromagnetic waves in other range.

In the first and second aspects of the present invention, the electromagnetic wave generating source such as electromagnetic generating means is not limited to one, but a plurality may be used. The electromagnetic wave may be irradiated to the mold not only from one direction, but also from multiple directions.

In the first aspect of the present invention, electromagnetic wave generating means for outputting (i.e. emitting) electromagnetic waves of 0.78 to 4 μm in wavelength, and a filter for decreasing the transmission amount of electromagnetic waves exceeding 2 μm in wavelength are used, and the electromagnetic waves output from the electromagnetic wave generating means are passed through the filter, and the transmission electromagnetic waves after passing through the filter are irradiated to the thermoplastic resin through the mold, and thereby the thermoplastic resin is heated, when filling the cavity with the thermoplastic resin.

In the second aspect of the present invention, the resin forming apparatus includes the electromagnetic wave generating means for outputting electromagnetic waves of 0.78 to 4 μm in wavelength, and a filter disposed between the electromagnetic wave generating means and the mold for decreasing the transmission amount of electromagnetic waves exceeding 2 μm in wavelength, wherein the resin forming apparatus is configured so that the electromagnetic waves output from the electromagnetic wave generating means are passed through the filter, and the transmission electromagnetic waves after passing through the filter are irradiated to the thermoplastic resin through the mold, when filling the cavity with the thermoplastic resin.

In these cases, when filling the cavity of the rubber-made mold with the thermoplastic resin, the electromagnetic wave generating means outputs electromagnetic waves in wavelength of 0.78 to 4 μm, and the transmission electromagnetic waves passing through the filter are irradiated to the thermoplastic resin through the mold. The electromagnetic waves irradiated from the electromagnetic wave generating means contains electromagnetic waves exceeding 2 μm in wavelength, but by using the filter, the electromagnetic waves exceeding the wavelength of 2 μm may be prevented from being irradiated to the mold as far as possible. As a result, the thermoplastic resin filled in the cavity of the mold may be effectively irradiated with the near-infrared ray of wavelength of 2 μm or less. Hence, the mold is not so much heated by the near-infrared ray of wavelength of 2 μm or less, so that the thermoplastic resin may be heated effectively.

The first aspect of the present invention includes a vacuum step of vacuating the cavity in the rubber-made mold, a filling step of filling the vacuated cavity with a melted thermoplastic resin, and a cooling step of cooling the thermoplastic resin in the cavity and obtaining the resin formed product, wherein the filling step is characterized by heating the thermoplastic resin by irradiating electromagnetic waves of 0.78 to 2 μm in wavelength to the thermoplastic resin through the mold.

In the second aspect of the present invention, the resin forming apparatus includes vacuum means for vacuating the cavity, and the electromagnetic wave generating means for outputting the electromagnetic waves of 0.78 to 2 μm in wavelength, wherein the resin forming apparatus is configured so that the electromagnetic waves are irradiated to the thermoplastic resin through the mold, when filling the cavity vacuated by the vacuum means with the thermoplastic resin.

In these cases, the cavity is in a vacuum state, so that the thermoplastic resin may spread fully into the entire cavity.

The vacuum state includes not only an absolute vacuum state, but also a decompressed state as far as the cavity may be filled with the thermoplastic resin.

The first aspect of the present invention includes a vacuum step of vacuating the cavity in the rubber-made mold, a filling step of filling the vacuated cavity with a melted thermoplastic resin, and a cooling step of cooling the thermoplastic resin in the cavity and obtaining the resin formed product, wherein the filling step is characterized by using electromagnetic wave generating means for outputting electromagnetic waves of 0.78 to 4 μm in wavelength, and a filter for decreasing the transmission amount of electromagnetic waves exceeding 2 μm in wavelength, and the electromagnetic waves output from the electromagnetic wave generating means are passed through the filter, and the transmission electromagnetic waves after passing through the filter are irradiated to the thermoplastic resin through the mold, and thereby the thermoplastic resin is heated.

In the second aspect of the present invention, the resin forming apparatus includes the vacuum means for vacuating the cavity, and the electromagnetic wave generating means for outputting the electromagnetic waves of 0.78 to 4 μm in wavelength, and a filter disposed between the electromagnetic wave generating means and the mold, for decreasing the transmission amount of electromagnetic waves exceeding 2 μm in wavelength, wherein the resin forming apparatus is configured so that the electromagnetic waves output from the electromagnetic wave generating means are passed through the filter, and the transmission electromagnetic waves after passing through the filter are irradiated to the thermoplastic resin through the mold when filling the cavity vacuated by the vacuum means with the thermoplastic resin.

In these cases, the cavity is in the vacuum state, so that the thermoplastic resin may spread fully into the entire cavity.

Electromagnetic waves irradiated from the electromagnetic wave generating means contain electromagnetic waves exceeding 2 μm in wavelength, but by using the filter, electromagnetic waves exceeding 2 μm in wavelength are not irradiated to the mold as far as possible. As a result, the near-infrared ray of 2 μm or less in wavelength may be effectively irradiated to the thermoplastic resin filled in the cavity of the mold. Hence the mold is not heated so much by the near-infrared ray of 2 μm or less in wavelength, and the thermoplastic resin may be heated effectively.

In the first and second aspects of the present invention, the filter is a quartz glass capable of decreasing the transmission amount of electromagnetic waves exceeding 2 μm in wavelength.

The filter may also be made of other material than quartz glass as far as it has a characteristic of decreasing the transmission amount of electromagnetic waves exceeding 2 μm in wavelength. For example, aside from quartz glass, the filter may be formed of porous glass (e.g. Vycor (registered trademark) glass), or borosilicate glass (e.g. Pyrex (registered trademark) glass).

In the first and second aspects of the present invention, the electromagnetic waves have an intensity peak in a wavelength region of 0.78 to 2 μm.

In this case, the thermoplastic resin may be heated more effectively by the near-infrared ray of 2 μm or less in wavelength.

In the first aspect of the present invention, preferably, the thermoplastic resin is heated to a higher temperature than the mold.

In this case, insufficient filling of the cavity with the thermoplastic resin may be more effectively prevented.

In the first aspect of the present invention, preferably, the thermoplastic resin in a melted state is cast into the cavity of the mold, and the viscosity of the thermoplastic resin in the melted state is prevented from becoming higher than 5000 Poise.

In this case, increase of melt viscosity of the thermoplastic resin is suppressed, and insufficient filling of the cavity of the mold with the thermoplastic resin may be more effectively prevented.

If the relation between temperature and melt viscosity of the thermoplastic resin is known beforehand, by irradiating the electromagnetic waves to the mold, the temperature of the thermoplastic resin is prevented from becoming lower than the temperature where the melt viscosity become higher than 5000 Poise, and the cavity may be filled with the thermoplastic resin in this state.

If the viscosity of the melted thermoplastic resin in the cavity becomes higher than 5000 Poise, insufficient filling of the cavity with the thermoplastic resin may occur.

The viscosity of the melted thermoplastic resin in the cavity is preferred to be as small as possible. In other words, at the filling step, by irradiating electromagnetic waves to the mold, preferably, the viscosity of thermoplastic resin is prevented from exceeding 1000 Poise, and is more preferably prevented from exceeding 500 Poise.

In the first aspect of the present invention, it is preferable that the mold is disposed in a pressure vessel capable of increasing and decreasing in pressure, and the pressure in the pressure vessel is decreased at the vacuum step to vacuate the cavity, and after the thermoplastic resin is cast into the cavity at the filling step, the inside of the pressure vessel is increased in pressure from the vacuum state.

In the second aspect of the present invention, it is preferable that the mold is disposed in a pressure vessel capable of increasing and decreasing in pressure, and wherein the inside of the pressure vessel is configured to be decompressed to a vacuum state by the vacuum means before the thermoplastic resin is cast into the cavity, and to be pressurized over the atmospheric pressure after the cast.

In these cases, after the melted thermoplastic resin is cast into the cavity in the vacuum state, the pressure vessel is increased in pressure so that the thermoplastic resin cast in the cavity may spread sufficiently into every narrow gap in the cavity.

In the first and second aspects of the present invention, when the mold is disposed in the pressure vessel, the electromagnetic wave source such as electromagnetic wave generating means may be disposed either inside or outside of the pressure vessel. In particular, the electromagnetic wave source is preferred to be disposed outside of the pressure vessel. In this case, the heated electromagnetic wave source may be cooled efficiently.

In the first and second aspects of the present invention, when the electromagnetic wave source is disposed outside of the pressure vessel, the filter may be disposed either inside or outside of the pressure vessel. The filter may also be disposed as a wall for composing the pressure vessel. In this case, in particular, the filter may be disposed at a wall for composing the pressure vessel, as an admission window of electromagnetic waves into the pressure vessel.

In the first aspect of the present invention, the thermoplastic resin before being filled into the cavity is a resin solid material formed larger than in a capacity for filling in the cavity, and the cavity is filled with the thermoplastic resin melted from the resin solid material, by making use of the own gravity of the thermoplastic resin.

When melting and casting pellets of the thermoplastic resin into the cavity of the rubber-made mold, air or gas existing among pellets may be mixed into the cavity. On the contrary, by melting the resin solid material and filling into the cavity, mixture of gas into the cavity may be prevented.

Moreover, by keeping the temperature of the thermoplastic resin in the cavity higher than the temperature of the mold, the cavity can be filled with the thermoplastic resin, by making use of the own gravity of the thermoplastic resin, without applying a large injection pressure (for example, 10 to 50 MPa).

The melted thermoplastic resin from the resin solid material can be filled into the cavity also by making use of the own weight of a pusher for pushing the thermoplastic resin from above.

In the first aspect of the present invention, an absorbance of the thermoplastic resin is larger than an absorbance of the rubber-made mold.

In this case, when the rubber-made mold and the thermoplastic resin are heated by irradiation of the near-infrared ray, the thermoplastic resin may be selectively heated easily. The absorbance may be measured by using, for example, UV3100 manufactured by Shimadzu Corporation.

In the first aspect of the present invention, the thermoplastic resin is preferred to be a noncrystalline thermoplastic resin.

Often in the first and second aspects of the present invention, the cooling speed of the thermoplastic resin is relatively slow. Accordingly, the crystallinity of the thermoplastic resin may become high in the cooling process, which may lead to decline of dimensional accuracy of the resin formed product or decline of impact resistance of the resin formed product. By contrast, by using the noncrystalline thermoplastic resin as the thermoplastic resin, decline of dimensional accuracy or decline of impact resistance of the resin formed product may be prevented.

Examples of the noncrystalline thermoplastic resin include styrene-acrylonitrile copolymer, styrene-maleic anhydride copolymer, styrene-methyl methacrylate copolymer, and other styrene compound resins, ABS resin (acrylonitrile-butadiene-styrene resin), AES resin (acrylonitrile-ethylene-propylene-diene-styrene resin), ASA resin (acrylate-styrene-acrylonitrile resin), and other rubber modified thermoplastic resins, or polymethyl methacrylate, polymethacrylate, polycarbonate resin (PC), PC/rubber modified thermoplastic resin alloys, and others. In particular, rubber modified thermoplastic resins are preferred, and ABS resin is particularly preferred.

In the first aspect of the present invention, the thermoplastic resin is preferred to be a rubber modified thermoplastic resin.

In this case, it is easier to heat the thermoplastic resin selectively from the rubber-made mold by the electromagnetic wave.

The rubber modified thermoplastic resin is not particularly specified, but is preferred to contain one or two or more polymers by graft polymerization of vinyl compound monomer in the presence of rubber polymer.

The rubber polymer is not particularly specified, but may include polybutadiene, butadiene-styrene copolymer, butadiene-acrylonitrile copolymer, ethylene-propylene copolymer, ethylene-propylene-non-conjugate diene copolymer, ethylene-butene-1 copolymer, ethylene-butene-1-non-conjugate diene copolymer, acrylic rubber, and silicone rubber, which may be used either alone or in combination of two or more types.

As the rubber polymer, in particular, polybutadiene, butadiene-styrene copolymer, ethylene-propylene copolymer, ethylene-propylene-non-conjugate diene copolymer, and acrylic rubber are preferred, and as the rubber modified thermoplastic resin, for example, ABS resin, AES resin, or ASA resin may be used. In particular, ABS resin is preferred.

In the first aspect of the present invention, the mold is preferably formed of silicone rubber.

In this case, it is easy to manufacture a mold, and the thermoplastic resin may be heated selectively by the electromagnetic wave while the mold is hardly heated.

The hardness of silicone rubber is preferred to be 25 to 80 as measured according to JIS-A method.

In the second aspect of the present invention, the resin forming apparatus includes the electromagnetic wave generating means for outputting the electromagnetic waves of 0.78 to 2 μm in wavelength, wherein the cavity is formed in a three-dimensional space formed of a plurality of plate-like spaces crossed and coupled with each other, and each plate-like space has a plane direction forming its outline profile, and a thickness direction perpendicular to the plane direction, and wherein the resin forming apparatus is configured so that the electromagnetic wave generating means irradiates the electromagnetic waves to the thermoplastic resin through the mold, and also irradiates the electromagnetic waves from an inclined direction or a perpendicular direction to the plane direction in each plate-like space, when filling the cavity with the thermoplastic resin.

In this case, the cavity in the mold is not formed in a simple flat space, but is formed in a three-dimensional space crossed and coupled a plurality of plate-like spaces having the plane direction and the thickness direction with each other. When the electromagnetic wave generating means irradiates electromagnetic waves in wavelength of 0.78 to 2 μm (also called near-infrared ray), if this near-infrared ray is irradiated from a direction parallel to the plane direction in the plate-like space, the near-infrared ray may not be irradiated to the inner side in the plane direction in the plate-like space (the side apart from the electromagnetic wave generating means).

By contrast, when filling the cavity with the thermoplastic resin, the electromagnetic wave generating means irradiates electromagnetic waves from an inclined direction or a perpendicular direction to the plane direction in each plate-like space. As a result, the entire plate-like space forming the cavity is irradiated with the near-infrared ray. Accordingly, the temperature of the thermoplastic resin in the entire cavity may be maintained high.

The irradiation of electromagnetic waves from the inclined direction or a perpendicular direction to the plane direction in each plate-like space means that the plane direction in any plate-like space out of the plurality of plate-like spaces may be perpendicular to the irradiation direction of the electromagnetic wave, but that the plane direction in the remaining plate-like spaces is inclined to the irradiation direction of the electromagnetic wave.

The plate-like space may be formed in various shapes such as flat plate or a curved plate. Besides, various protruding spaces may be formed in part of the plate-like space.

In the second aspect of the present invention, the resin forming apparatus includes the electromagnetic wave generating means for outputting electromagnetic waves of 0.78 to 4 μm in wavelength, and the filter disposed between the electromagnetic wave generating means and the mold for decreasing the transmission amount of electromagnetic waves exceeding 2 μm in wavelength, wherein the cavity is formed in the three-dimensional space formed of the plurality of plate-like spaces crossed and coupled with each other, and each plate-like space has the plane direction forming its outline profile, and the thickness direction perpendicular to the plane direction, and wherein the resin forming apparatus is configured so that the electromagnetic wave generating means irradiates the transmission electromagnetic waves after passing through the filter to the thermoplastic resin through the mold, and also irradiates the transmission electromagnetic waves from an inclined direction or a perpendicular direction to the plane direction in each plate-like space when filling the cavity with the thermoplastic resin.

In this case, when filling the cavity in the rubber-made mold with the thermoplastic resin, the electromagnetic wave generating means outputs electromagnetic waves in wavelength of 0.78 to 4 μm, and the transmission electromagnetic waves after passing through the filter are irradiated to the thermoplastic resin through the mold. The electromagnetic waves output from the electromagnetic wave generating means contain electromagnetic waves exceeding 2 μm in wavelength, but the electromagnetic waves exceeding 2 μm in wavelength are suppressed by the filter so as not to be irradiated to the mold as far as possible. As a result, the near-infrared ray of 2 μm or less in wavelength may be effectively irradiated to the thermoplastic resin contained in the cavity of the mold. Hence, the mold is not heated so much by the near-infrared ray of 2 μm or less in wavelength, and the thermoplastic resin may be heated effectively.

The cavity of the mold is not formed in a simple flat space, but is formed in a three-dimensional space crossed and coupled a plurality of plate-like spaces having the plane direction and the thickness direction with each other. When filling the cavity with the thermoplastic resin, the electromagnetic wave generating means irradiates the near-infrared ray from an inclined direction or a perpendicular direction to the plane direction in each plate-like space. As a result, the entire plate-like space forming the cavity is effectively irradiated with the near-infrared ray of 2 μm or less in wavelength. Accordingly, the temperature of the thermoplastic resin in the entire cavity may be maintained high.

In the second aspect of the present invention, the resin forming apparatus includes the electromagnetic wave generating means for generating electromagnetic waves of 0.78 to 4 μm in wavelength, and the filter disposed between the electromagnetic wave generating means and the mold for decreasing the transmission amount of electromagnetic waves exceeding 2 μm in wavelength, wherein the filter has filter water filled in a gap formed between transparent plates of a transparent material, and also includes an inlet for flowing the filter water into the gap, and an outlet for discharging the filter water from the gap, wherein the resin forming apparatus is configured so that the filter decreases the transmission amount of electromagnetic waves exceeding 2 μm in wavelength by the filter water, and is able to exchange the filter water through the inlet and the outlet, and wherein the resin forming apparatus is configured so that the electromagnetic wave generating means irradiates the transmission electromagnetic waves after passing through the filter to the thermoplastic resin through the mold, thereby heating the thermoplastic resin, when filling the cavity with the thermoplastic resin.

The electromagnetic waves output from the electromagnetic wave generating means may contain electromagnetic waves exceeding 2 μm in wavelength, but the electromagnetic waves exceeding 2 μm in wavelength may be suppressed by the filter so as not to be irradiated to the mold as far as possible. As a result, the near-infrared ray of 2 μm in wavelength may be effectively irradiated to the thermoplastic resin filled in the cavity of the mold. Hence, by the near-infrared ray of 2 μm or less in wavelength, the thermoplastic resin may be heated effectively without heating the mold substantially.

In this case, the filter has a gap formed in transparent plates filled with the filter water. The electromagnetic waves output from the electromagnetic wave generating means pass through a water membrane of the filter water, and the transmission amount of electromagnetic waves exceeding 2 μm in wavelength is decreased, and the transmission electromagnetic waves after passing through the filter water are irradiated to the thermoplastic resin through the mold.

Hence, the filter capable of decreasing the transmission amount of electromagnetic waves exceeding 2 μm in wavelength may be composed easily.

The filter water may exchange the inlet and outlet formed in the filter. Hence, if the temperature of the filter water in the gap is raised by absorbing a part of the electromagnetic waves irradiated from the electromagnetic wave generating means, the filter water after temperature rise may be exchanged with the other filter water lower in temperature.

Hence, temperature rise of the filter may be suppressed effectively, and the filter cooling structure may be realized in a simple structure.

Accordingly, the thermoplastic resin in the cavity can be heated selectively in the rubber-made mold, and the filter for enhancing this heating effect may be composed in a simple structure having a cooling function.

The filter water may be tap water or other pure water. Aside from pure water, as the filter water, water mixed with various types of solvent high in cooling performance may be used.

In the second aspect of the present invention, when the cavity is formed in a three-dimensional space crossed and coupled a plurality of plate-like spaces with each other, and the electromagnetic wave is irradiated from an inclined direction or a perpendicular direction to the plane direction in each plate-like space, and when the filter is formed in the gap formed between transparent plates made of a transparent material being filled with the filter water, it is preferable that the resin forming apparatus has the vacuum means for vacuating the cavity, and the vacuum means is configured to fill the cavity vacuated by the vacuum means with the thermoplastic resin.

In this case, the cavity is in the vacuum state, so that the thermoplastic resin may spread fully into the entire cavity. The vacuum state includes not only an absolute vacuum state, but also a decompressed state as far as the cavity may be filled with the thermoplastic resin.

In the second aspect of the present invention, the thermoplastic resin before being filled into the cavity is a resin solid material formed larger than in a capacity for filling in the cavity, and wherein the resin forming apparatus has a heating and holding container for heating and holding the resin solid material, and is configured so that the semi-melted resin solid material from the heating and holding container is inserted and disposed in a resin receiving part provided in the upper part of the cavity.

In this case, the resin solid material formed larger than the capacity to fill in the cavity is melted halfway, and inserted and disposed in the resin receiving part in the upper part of the cavity, so that the thermoplastic resin is accepted in the resin receiving part in a state almost free from air or other gas. Accordingly, by casting the thermoplastic resin into the cavity from the resin receiving part, entry of undesired gas into the cavity can be effectively prevented.

The resin solid material may be formed in a capacity enough to fill in the entire cavity, for example, about 1 to 1.5 times of the cavity capacity.

In the second aspect of the present invention, the resin solid material has a hollow shape consisting of a bottom and a side wall standing up from the bottom in an annular shape, and wherein the heating and holding container has an outer heater for heating the outer periphery of the side wall, and an inner heater for heating the inner periphery of the side wall.

In this case, the resin solid material may be heated effectively in the heating and holding container, and may be quickly formed in a semi-melted state.

When the cavity is formed in a three-dimensional space crossed and coupled a plurality of plate-like spaces with each other, and the electromagnetic wave is irradiated from an inclined direction or a perpendicular direction to the plane direction in each plate-like space, the following configurations may be employed.

The resin forming apparatus has a pressure vessel containing the mold, and a vacuum pump for vacuating the pressure vessel, and the mold is placed on a platform in the pressure vessel, and the mold may be placed on the platform so that the plane direction in each plate-like space may form an inclined state or a perpendicular state to the direction of irradiation of the electromagnetic wave by the electromagnetic wave generating means.

In this case, by filling the cavity in a vacuum state with the thermoplastic resin, the thermoplastic resin may fully permeate into the entire cavity more easily. The vacuum state includes not only an absolute vacuum state, but also a decompressed state as far as the cavity may be filled with the thermoplastic resin.

In this case, the electromagnetic wave may be irradiated easily from an inclined direction or a perpendicular direction to the plane direction in each plate-like space by the electromagnetic wave generating means.

The resin molding apparatus provided with the vacuum means may be formed easily, and only by exchanging the mold to be put on the platform, resin formed products of various shapes may be formed in various molds.

The electromagnetic wave generating means may be disposed either outside or inside of the pressure vessel.

The electromagnetic wave generating means is disposed at a side in the outside of the pressure vessel, and the electromagnetic wave may be irradiated to the mold through a transparent window formed in the pressure vessel.

In this case, the electromagnetic wave generating means may be disposed easily, and the pressure vessel may be formed compactly.

The mold has a reference mounting plane opposite to the platform in the pressure vessel, and the plane direction in each plate-like space may be formed in an inclined state or a perpendicular state to the reference mounting plane.

In this case, by forming the cavity in the mold at an inclination to the reference mounting plane, the electromagnetic wave may be easily irradiated from the inclined direction to the plane direction in each plate-like space.

The electromagnetic wave generating means may be formed to irradiate the electromagnetic wave from an oblique side direction of the mold placed on the platform.

In this case, since the irradiating direction of the electromagnetic wave by the electromagnetic wave generating means is inclined to the mold, the electromagnetic wave may be easily irradiated from a direction inclined to the plane direction in each plate-like space.

The resin forming apparatus may also be composed to move the mold mounted on the platform, and the electromagnetic wave generating means relatively, so as to irradiate the electromagnetic wave from a direction inclined to the plane direction in each plate-like space.

In this case, at least one of the platform or the electromagnetic wave generating means in the pressure vessel is designed to be movable, and the electromagnetic wave may be irradiated easily from a direction inclined to the plane direction in each plate-like space.

The electromagnetic wave generating means may also be configured to change the irradiating direction of the electromagnetic wave to the mold mounted on the platform.

In this case, the electromagnetic wave may be irradiated more easily from a direction inclined to the plane direction in each plate-like space.

When the filter is formed by filling the gap formed between transparent plates made of the transparent material with the filter water, the following configurations may be employed.

The filter water sequentially circulates in the gap through the inlet and the outlet.

In this case, part of the electromagnetic wave irradiated from the electromagnetic wave generating means is absorbed, and the filter water may be exchanged earlier before the temperature of the filter water rises. As a result, the cooling function of the filter is enhanced.

The filter water is taken from a water tank, and is supplied into the inlet by using a water feed pump or the like, and the heated filter water is put back into the water tank from the outlet so as to be circulated in the gap.

The filter water is not only circulated sequentially, but also exchanged when heated to a specified temperature.

The gap between the transparent plates may be formed in a thickness of 0.5 to 3 mm.

In this case, the filter water of a proper thickness is held in the gap between transparent plates, and this filter water effectively decreases the transmission amount of electromagnetic wave exceeding 2 μm in wavelength.

If the thickness of the gap is less than 0.5 mm, the absorbing effect of electromagnetic waves exceeding 2 μm in wavelength by the filter water may not be obtained sufficiently. On the other hand, if the thickness of the gap exceeds 3 mm, the water membrane by the filter water cannot be passed not only by the electromagnetic wave exceeding 2 μm in wavelength, but also by the near-infrared ray of 2 μm or less in wavelength, and the filer water may absorb most of the near-infrared ray of 2 μm or less in wavelength.

The transparent plates may be glass plates.

In this case, the filer may be formed easily by using the glass plates.

The resin forming apparatus has a pressure vessel containing the mold, and a vacuum pump for vacuating the pressure vessel, and the cavity vacuated by the vacuum pump is filled with the thermoplastic resin, and the filter is disposed as a transparent window in the pressure vessel, and the electromagnetic wave generating means is disposed outside of the pressure vessel, and the transmission electromagnetic wave may be irradiated to the mold through the filter as the transparent window.

In this case, the cavity in the vacuum state is filled with the thermoplastic resin, and this thermoplastic resin may permeate into the entire cavity more easily. The vacuum state includes not only an absolute vacuum state, but also a decompressed state as far as the cavity may be filled with the thermoplastic resin.

By composing the transparent window in the pressure vessel by the filter, the resin forming apparatus may be composed easily.

The resin forming apparatus has a pressure vessel containing the mold, and a vacuum pump for vacuating the pressure vessel, and the cavity vacuated by the vacuum pump is filled with the thermoplastic resin, and the pressure vessel has a transparent window formed by pressure-proof glass, and the filter is disposed at the outer side of the container of the transparent window, and the electromagnetic wave generating means is disposed outside of the pressure vessel, and the transmission electromagnetic wave may be irradiated to the mold through the filter and the transparent window.

In this case, too, since the cavity in vacuum state is filled with the thermoplastic resin, this thermoplastic resin may permeate into the entire cavity more easily. Since the transparent window of the pressure vessel is formed by pressure-proof glass, the strength of the pressure vessel may be easily maintained at high level. By disposing the filter at the outer side of the container of the transparent window, the resin forming apparatus may be composed easily.

As the pressure-proof glass, various types of glass capable of withstanding vacuum pressure may be used.

EXEMPLARY EMBODIMENTS

Embodiments of the resin forming method and a resin forming apparatus of the present invention are specifically described below together with the accompanying drawings.

Embodiment 1

The resin forming method of the embodiment is, as shown in FIG. 1, a method of obtaining a resin formed product by filling a cavity 21 of a rubber-made mold 2 with a thermoplastic resin 3, and cooling this thermoplastic resin 3. In the resin forming method of the embodiment, when forming a resin formed product, the thermoplastic resin 3 may be heated selectively from the mold 2.

Specifically, as shown in the drawing, in the embodiment, when filling the cavity 21 with the thermoplastic resin 3, by irradiating an electromagnetic wave of 0.78 to 2 μm in peak wavelength (also called near-infrared ray hereinafter) to the thermoplastic resin 3 from the surface of the mold 2, the thermoplastic resin 3 is heated selectively from the mold 2. In the embodiment, the resin forming apparatus 1 includes the rubber-made mold 2, and electromagnetic wave generating means 4 for irradiating the near-infrared ray.

In this context, the peak wavelength refers to the wavelength showing the peak value of electromagnetic wave intensity among the electromagnetic waves irradiated to the mold 2 and the thermoplastic resin 3 by the electromagnetic wave generating means 4.

The resin forming method and the resin forming apparatus 1 of the embodiment are described with reference to FIG. 1.

In the embodiment, the thermoplastic resin 3 is a noncrystalline thermoplastic resin, and ABS resin which is a rubber modified thermoplastic resin.

The mold 2 of the embodiment is formed of a silicone rubber. The mold 2 is fabricated by disposing a master model (hand-made piece or the like) of the resin formed product to be manufactured in the liquid silicone rubber, curing the silicone rubber, and taking out the master model from the cured silicone rubber.

The electromagnetic wave generating means 4 of the embodiment is a near-infrared ray halogen heater having a peak of light intensity around 1.2 μm in the near-infrared ray region.

In the embodiment, the melted thermoplastic resin 3 is cast into the cavity 21 of the mold 2, and the near-infrared ray is irradiated to the mold 2, and the viscosity of the melted thermoplastic resin 3 is prevented from becoming higher than 5000 Poise, and a resin formed product is obtained.

When fabricating the resin formed product of the embodiment, the cavity 21 of the silicone rubber-made mold 2 is filled with ABS resin as the thermoplastic resin 3. At the time of filling, using the electromagnetic wave generating means 4, the near-infrared ray is irradiated to the thermoplastic resin 3 from the surface of the mold 2. At this time, due to difference in the properties between the silicone rubber for composing the mold 2 and the ABS resin, the ABS resin can be heated more than the mold 2.

As a result, in the process until the cavity 21 is fully filled with the ABS resin, the temperature of the ABS resin in the cavity 21 may be kept higher than the temperature of the mold 2.

According to the resin forming method and the resin forming apparatus 1 of the embodiment, hence, the ABS resin may be heated selectively from the silicon rubber-made mold 2, and the ABS resin may permeate fully into the entire cavity 21 of the mold 2. Therefore, a resin formed product excellent in surface appearance may be obtained.

In the embodiment, the manufactured resin formed product is cooled in air in the cavity 21 of the mold 2, and is taken out of the cavity 21. At this time, as mentioned above, since the thermoplastic resin 3 may be heated selectively, the temperature of the mold 2 may be maintained lower than the temperature of the thermoplastic resin 3. Hence, the cooling time required for cooling the resin formed product may be shortened.

Since the temperature of the mold 2 can be kept low, deterioration of the mold 2 may be suppressed, and the durability of the mold 2 may be enhanced.

In the embodiment, the ABS resin is used as the thermoplastic resin 3. As the thermoplastic resin 3, other thermoplastic resin 3 may be used as far as it is capable of absorbing the near-infrared ray passing through, not being absorbed in the mold 2, when the near-infrared ray is irradiated to the surface of the mold 2.

Figure 2:
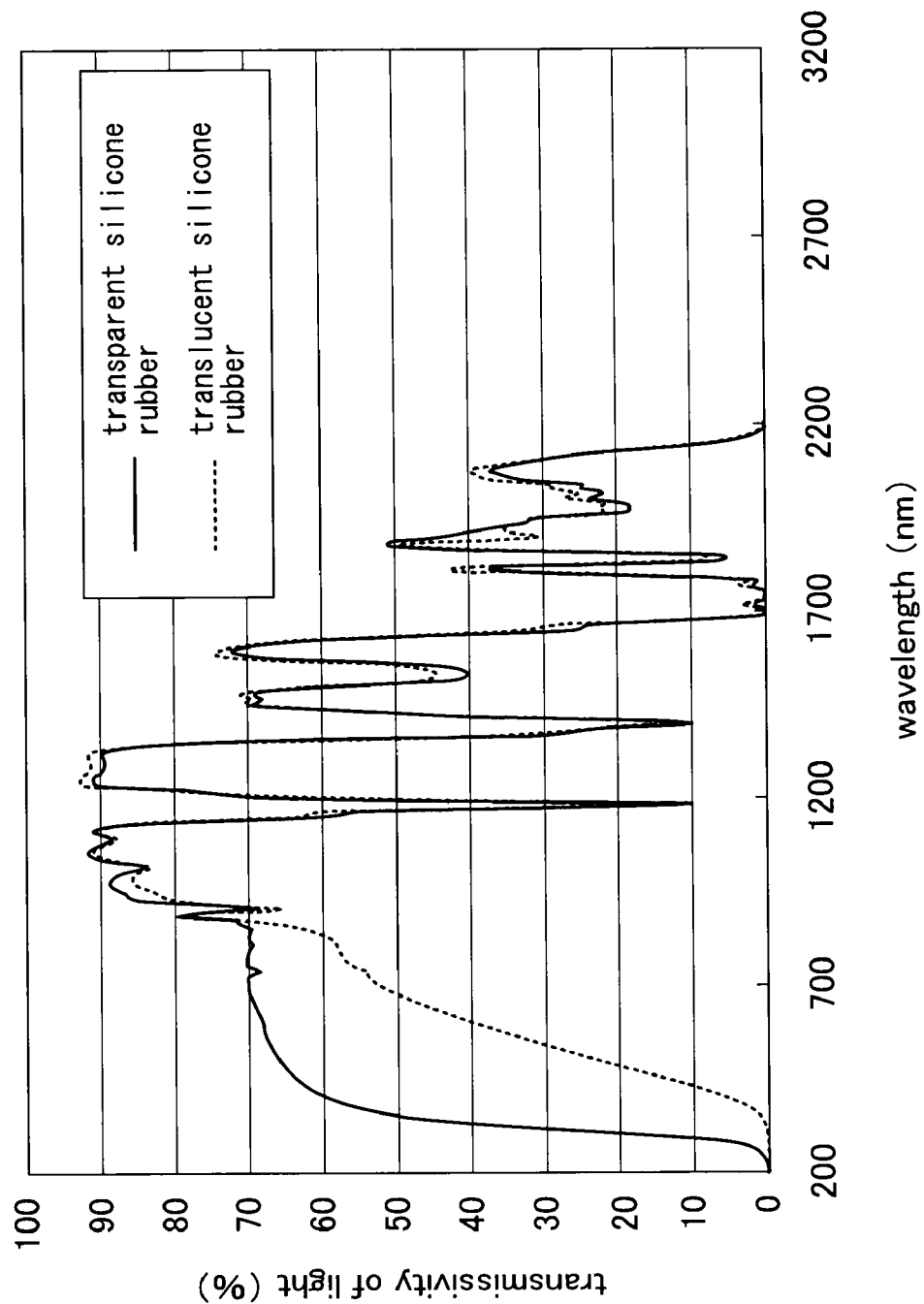
FIG. 2 is a graph showing transmissivity of light of transparent silicone rubber and translucent silicone rubber, in which the wavelength (nm) is plotted on the axis of abscissas and the transmissivity (%) of the light is plotted on the axis of ordinates, in embodiment 1.

FIG. 2 is a graph showing the transmissivity of light in various types of the silicone rubber of transparent silicone rubber and translucent silicone rubber, in which the wavelength (nm) is plotted on the axis of abscissas and the light transmissivity (%) is plotted on the axis of ordinates. In the graph, these silicon rubbers are known to pass light in the wavelength of 200 to 2200 nm. Hence, when the near-infrared ray in this wavelength region is irradiated to the surface of the mold 2 made of the silicone rubber, most of the near-infrared ray is passed through the mold 2, and is absorbed in the thermoplastic resin 3.

Embodiment 2

Figure 3:
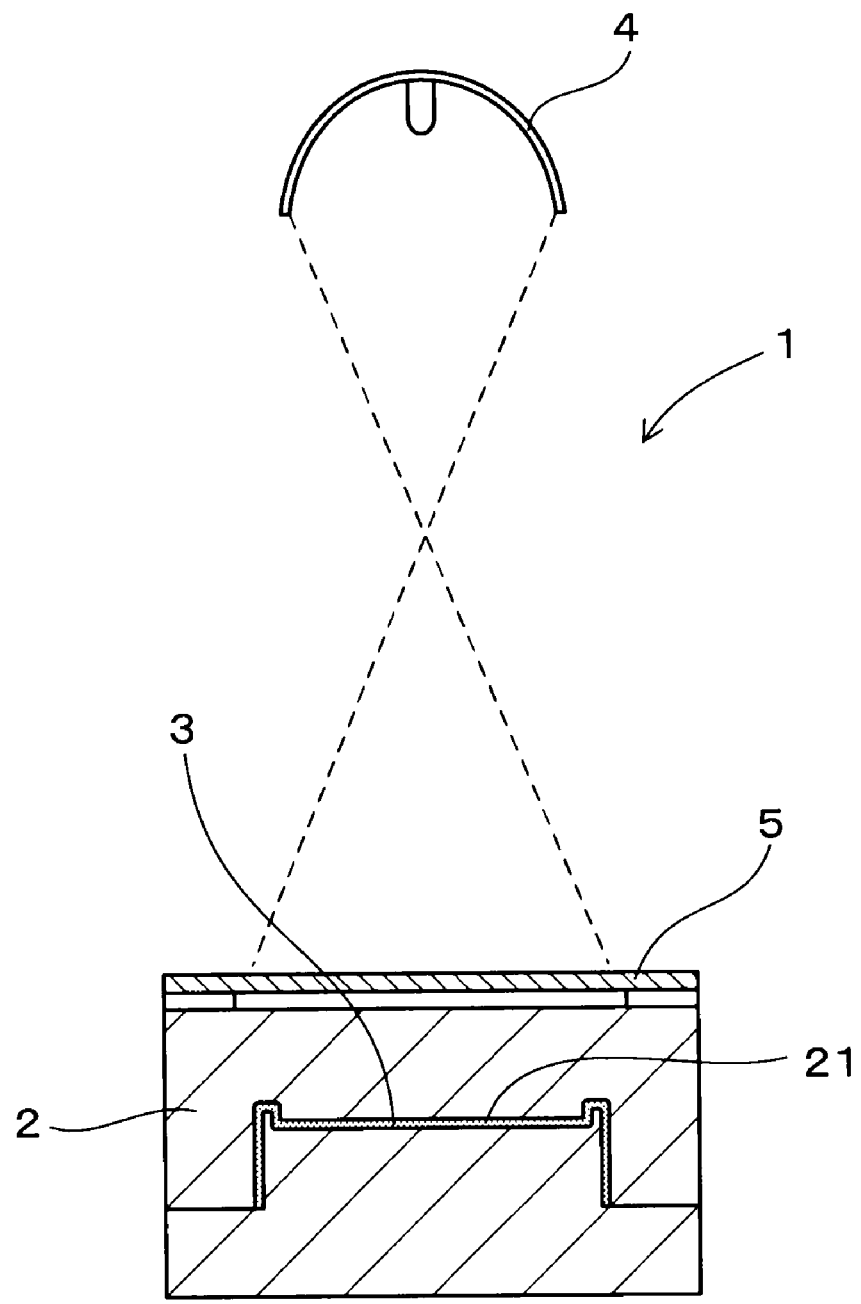
FIG. 3 is an explanatory diagram of the resin forming apparatus in embodiment 2.

In the resin forming method of the embodiment, as shown in FIG. 3, the cavity 21 of mold 2 made of rubber is filled with the thermoplastic resin 3, and this thermoplastic resin 3 is cooled, and a resin formed product is obtained. In the resin forming method of the embodiment, when manufacturing a resin formed product, the thermoplastic resin 3 can be heated selectively from the mold 2.

Specifically, as shown in the same drawing, in the embodiment, when filling the cavity 21 with the thermoplastic resin 3, a resin forming apparatus 1 having electromagnetic wave generating means 4 for outputting electromagnetic waves having a peak of intensity in a wavelength region of 0.78 to 4 μm, and a filter 5 for decreasing the transmission amount of electromagnetic waves exceeding 2 μm in wavelength is used. The electromagnetic wave output from the electromagnetic wave generating means 4 is passed through the filter 5, and the transmission electromagnetic wave after passing through the filter 5 is irradiated to the thermoplastic resin 3 through the mold 2, and the thermoplastic resin 3 is heated selectively from the mold 2.

The resin forming method and the resin forming apparatus 1 of the embodiment are described with reference to FIG. 3.

In the embodiment, the thermoplastic resin 3 is the non-crystalline thermoplastic resin 3, and the ABS resin which is a rubber modified thermoplastic resin.

The mold 2 of the embodiment is formed of a silicone rubber. The mold 2 is fabricated by disposing a master model (hand-made piece or the like) of the resin formed product to be manufactured in the liquid silicone rubber, curing the silicone rubber, and taking out the master model from the cured silicone rubber.

The absorbance of electromagnetic waves (light) of 0.78 to 2 μm in wavelength (the scale showing the absorption intensity to light of a specific wavelength) is larger in the ABS resin used as the thermoplastic resin 3 than the silicone rubber used as the rubber-made mold 2.

The electromagnetic wave generating means 4 of the embodiment is a near-infrared ray halogen heater having a peak of light intensity around 1.2 μm in the near-infrared ray region.

The filter 5 in the embodiment is formed of a quartz glass capable of decreasing the transmission amount of electromagnetic waves exceeding 2 μm in wavelength.

In the embodiment, the melted thermoplastic resin 3 is cast into the cavity 21 of the mold 21, and the near-infrared ray of 2 μm or less in wavelength is irradiated to the mold 2, and the viscosity of the melted thermoplastic resin 3 is prevented from becoming higher than 5000 Poise, and thereby a resin formed product is obtained.

When manufacturing a resin formed product of the embodiment, the cavity 21 of the mold 2 of a silicone rubber is filled with the ABS resin as the thermoplastic resin 3. At the time of filling, using the electromagnetic wave generating means 4, the electromagnetic wave having an intensity peak in wavelength region of 0.78 to 2 μm is output, and the transmission electromagnetic wave after passing through the filter 5 is irradiated to the thermoplastic resin 3 through the mold 2. At this time, due to difference in the properties between the rubber for composing the mold 2 and the thermostatic resin 3, the thermostatic resin 3 can be heated more than the mold 2.

As a result, in the process until the cavity 21 is fully filled with the thermostatic resin 3, the temperature of the thermostatic resin 3 in the cavity 21 may be kept higher than the temperature of the mold 2.

The electromagnetic waves output from the electromagnetic wave generating means contain electromagnetic waves exceeding 2 μm in wavelength, but by using the filter 5, the electromagnetic waves exceeding 2 μm in wavelength may be prevented from being irradiated to the mold 2 as far as possible. Hence, the near-infrared ray of 2 μm or less in wavelength may be effectively irradiated to the thermoplastic resin 3 contained in the cavity 21 of the mold 2. Hence, the thermoplastic resin 3 may be heated effectively, while the mold 2 is not heated so much, by the near-infrared ray of 2 μm or less in wavelength.

Hence, according to the resin forming method and the resin forming apparatus 1 of the embodiment, the thermoplastic resin 3 may be heated selectively from the mold 2 made of a silicone rubber, and the thermoplastic resin 3 may permeate sufficiently into the entire cavity 21 of the mold 2. As a result, a resin formed product excellent in surface appearance may be obtained.

In the embodiment, the manufactured resin formed product is cooled in air in the cavity 21 of the mold 2, and is taken out of the cavity 21. At this time, since the thermoplastic resin 3 can be heated selectively as mentioned above, the temperature of the mold 2 can be kept lower than the temperature of the thermoplastic resin 3. As a result, the cooling time required for cooling the resin formed product may be shortened.

Since the temperature of the mold 2 is kept low, deterioration of the mold 2 is suppressed, and the durability of the mold 2 may be enhanced.

In the embodiment, the ABS resin is used as the thermoplastic resin 3. As the thermoplastic resin 3, other thermoplastic resin 3 may be used as far as it can absorb the electromagnetic wave in the wavelength hardly absorbed in the mold 2 when the electromagnetic wave is irradiated to the surface of the mold.

Embodiment 3

Figure 4:
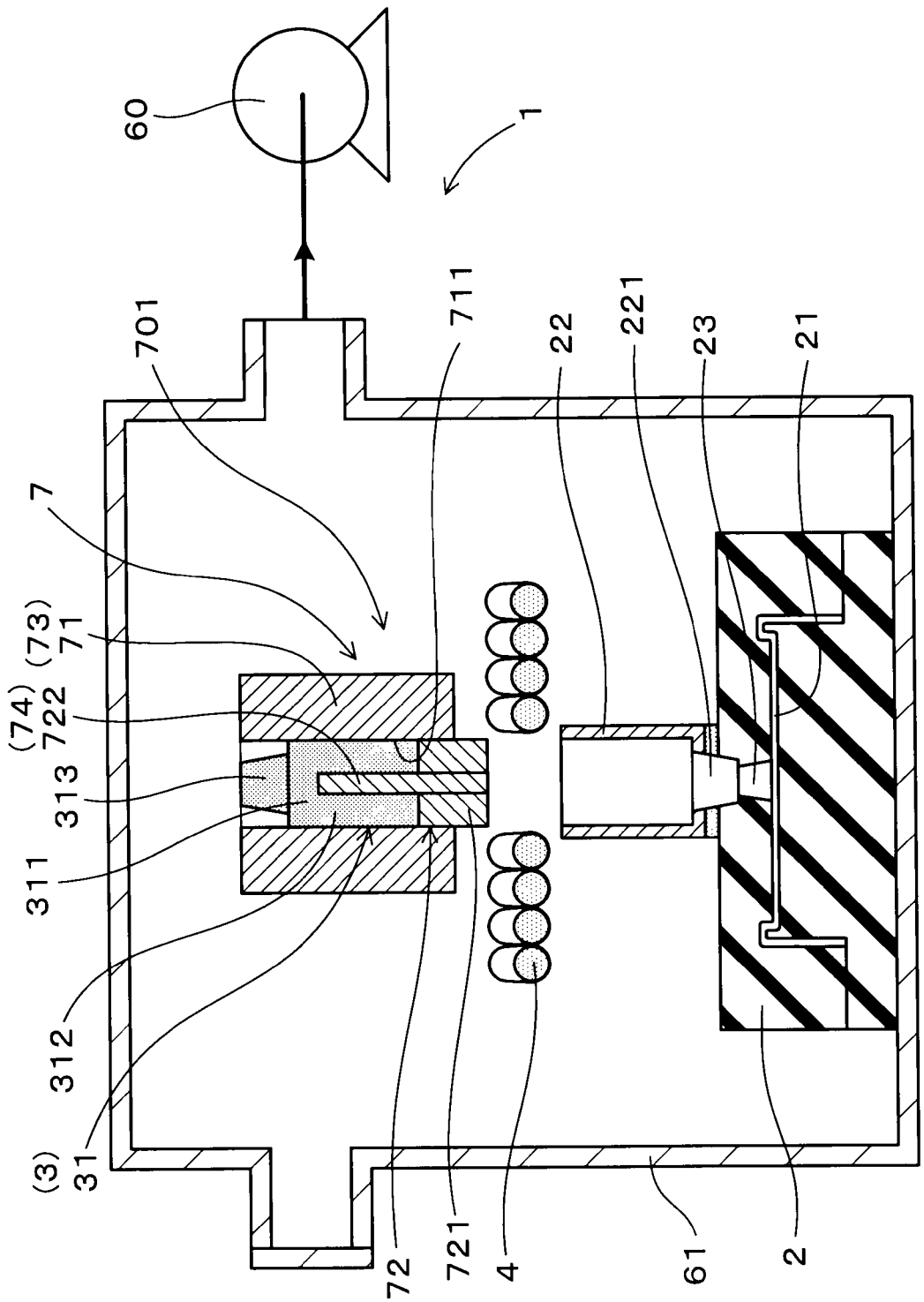
FIG. 4 is an explanatory diagram of the resin forming apparatus before filling the mold with the thermoplastic resin in embodiment 3.
Figure 5:
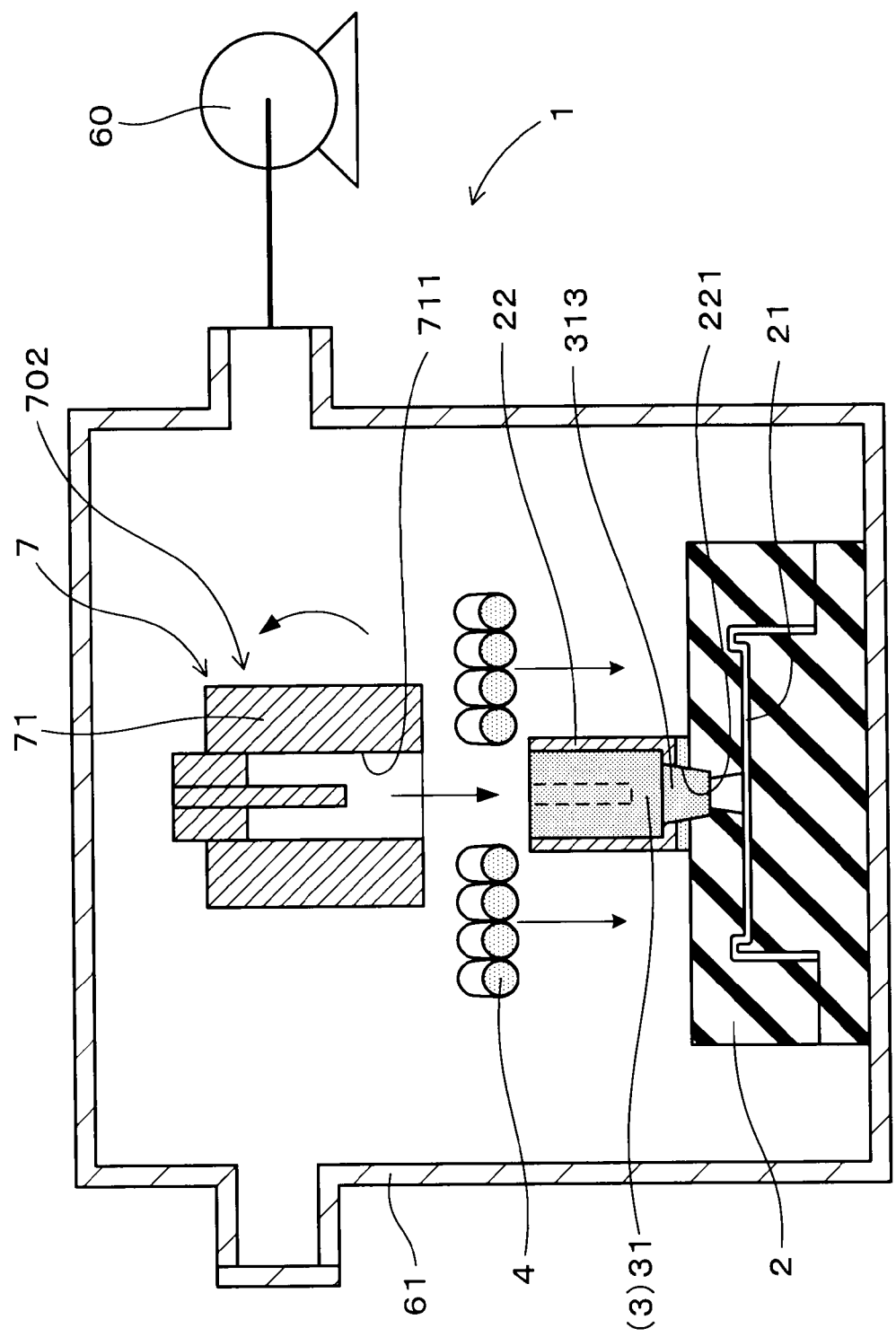
FIG. 5 is an explanatory diagram of the resin forming apparatus in which a resin solid material is dropped into a resin receiving part provided in the mold in embodiment 3.
Figure 6:
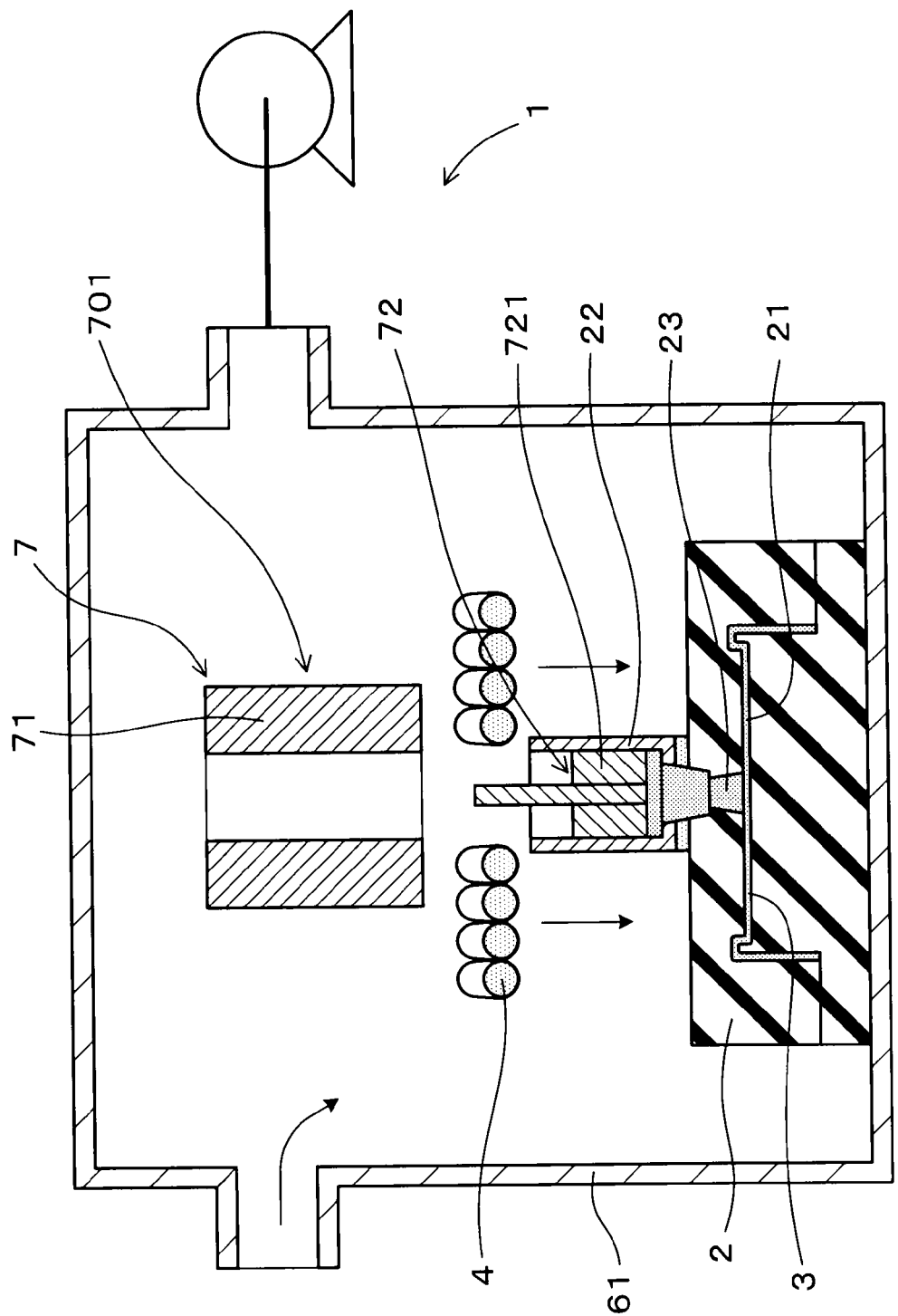
FIG. 6 is an explanatory diagram of the resin forming apparatus in which the mold is filled with the thermoplastic resin in embodiment 3.

The resin forming method of the embodiment is, as shown in FIG. 4 to FIG. 6, the cavity 21 of the rubber-made mold 2 is filled with the thermoplastic resin 3 by a vacuum injection method, and this thermoplastic resin 3 is cooled, and a resin formed product is obtained. In the resin forming method of the embodiment, when manufacturing a resin formed product, the thermoplastic resin 3 can be heated selectively from the mold 2.

Specifically, as shown in the same drawing, the method includes a vacuum step of vacuating the cavity 21 of the rubber-made mold 2, a filing step of filling the vacuated cavity 21 with melted thermoplastic resin 3, and a cooling step of cooling the thermoplastic resin 3 in the cavity 21 to obtain a resin formed product. At the filling step, by irradiating electromagnetic waves having an intensity peak in wavelength region of 0.78 to 2 μm to the thermoplastic resin 3 through the mold 2, the thermoplastic resin 3 is heated selectively from the mold 2. In the embodiment, the thermoplastic resin 3 is heated to a higher temperature than the mold 2.

In the embodiment, the resin forming apparatus 1 includes, as shown in FIG. 4, a mold 2 made of rubber forming the cavity 21, vacuum means 60 for vacuating the cavity 21, and the electromagnetic wave generating means 4 for irradiating the near-infrared ray.

The resin forming method and the resin forming apparatus 1 of the embodiment are described specifically below with reference to FIG. 4 to FIG. 7.

In the embodiment, the thermoplastic resin 3 is the non-crystalline thermoplastic resin, and the ABS resin which is a rubber modified thermoplastic resin.

The mold 2 of the embodiment is formed of a silicone rubber. The mold 2 is fabricated by disposing a master model (hand-made piece or the like) of the resin formed product to be manufactured in the liquid silicone rubber, curing the silicone rubber, and taking out the master model from the cured silicone rubber.

The absorbance of electromagnetic waves (light) of 0.78 to 2 μm in wavelength (the scale showing the absorption intensity to light of a specific wavelength) is larger in the ABS resin used as the thermoplastic resin 3 than the silicone rubber used as the rubber-made mold 2.

As shown in FIG. 4, the electromagnetic wave generating means 4 of the embodiment is a near-infrared ray halogen heater having a peak of light intensity around 1.2 μm in the near-infrared ray region.

In the embodiment, the melted thermoplastic resin 3 is cast into the cavity 21 of the mold 2, and the near-infrared ray is irradiated to the mold 2, and the viscosity of the melted thermoplastic resin 3 is prevented from becoming higher than 5000 Poise, and a resin formed product is obtained.

As shown in the same drawing, the mold 2 of the embodiment is disposed in a pressure vessel 61 capable of increasing and decreasing in pressure. The pressure vessel 61 of the embodiment is a container for vacuum injection. The vacuum means 60 is a vacuum pump disposed in the pressure vessel 61, and is designed to vacuate the pressure vessel 61.

Figure 7:
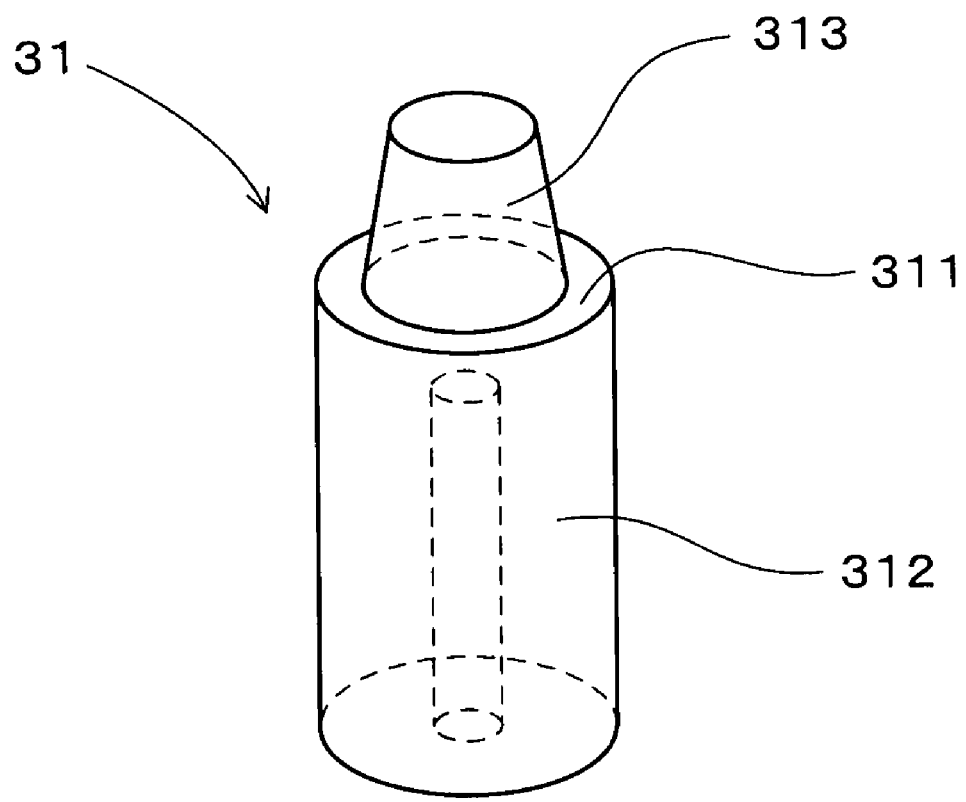
FIG. 7 is a perspective view of a resin solid material in embodiment 3.

As shown in FIG. 7, the thermoplastic resin 3 of the embodiment is a resin solid material 31 formed in a capacity for filling in the entire cavity 21 in an initial state before being put into the cavity 21. The resin solid material 31 has a hollow shape including a bottom 311, and a side wall 312 standing from the wall 311 in an annular form.

As shown in FIG. 4, a resin receiving part 22 is formed in the upper part of the cavity 21 in the mold 2 for inserting and disposing the thermoplastic resin 3. In the mold 2, the lower part of the resin receiving part 22 and the upper part of the cavity 21 are coupled together by means of a casting gate 23.

Further as shown in FIG. 4, the resin forming apparatus 1 of the embodiment has a heating and holding container 7 for heating and holding the resin solid material 31. The heating and holding container 7 has a container outer periphery 71 forming a hollow hole 711 for inserting the resin solid material 31, and a container slide part 72 for sliding in the hollow hole 711. The container slide part 72 has a load part 721 formed nearly in the same diameter as the hollow hole 711, and a projection pin part 722 disposed in the side wall 312 of the resin solid material 31 inserted and disposed in the hollow hole 711.

The container outer periphery 71 includes an outer heater 73 for heating the outer periphery of the side wall 312 of the resin solid material 31, and the projection pin part 722 of the container slide part 72 includes an inner heater 74 for heating the inner periphery of the side wall 312 of the resin solid material 31.

By using the resin solid material 31, entry of undesired air or gas into the cavity 21 may be easily prevented. Since the resin solid material 31 is formed in the hollow shape, in which the outer heater 73 and the inner heater 74 are used, the resin solid material 31 can be heated uniformly as much as possible.

As shown in FIG. 7, the resin solid material 31 has a protrusion 313 projecting in a taper shape in its bottom 311. This protrusion 313 has a circular section, and is reduced in diameter gradually toward the leading end of the bottom 311.

As shown in FIG. 4, in the bottom 311 of the resin receiving part 22, a neck 221 is formed along the taper shape of the protrusion 313 of the resin solid material 31. As shown in FIG. 5, when the semi-melted resin solid material 31 is dropped into the resin receiving part 22 with its protrusion 313 downward, the protrusion 313 of the resin solid material 31 is guided into the center of the resin receiving part 22 by the neck 221. As a result, the semi-melted resin solid material 31 may be inserted and disposed in the resin receiving part 22 stably in a positioned state.

The heating and holding container 7 of the embodiment is designed to be inverted vertically, and is changed over between a resin receiving state 701 having the projection pin part 722 directed upward as shown in FIG. 4, and a resin discharging state 702 having the projection pin part 722 directed downward as shown in FIG. 5.

The heating and holding container 7, in the resin receiving state 701, as shown in FIG. 4, holds the resin solid material 31, and heats this resin solid material 31 by the outer heater 73 and the inner heater 74 until melted in a half-melted state. On the other hand, the heating and holding container 7, in the resin discharging state 702, as shown in FIG. 5, drops the semi-melted resin solid material 31 into the resin receiving part 22 provided in the upper part of the cavity 21.

As shown in FIG. 6, in the mold 2 of the embodiment, the semi-melted thermoplastic resin 3 is received from the heating and holding container 7, and the thermoplastic resin 3 is dropped into the cavity 21 by its own gravity. The heating and holding container 7, after dropping the resin solid material 31 into the resin receiving part 22, is inverted again to the resin receiving state 701, and the melted resin solid material 31 in the resin receiving part 22 is pressed down by the load part 721 in the container slide part 72.

The method of fabricating a resin formed product by using this resin forming apparatus 1 is explained below.

In the embodiment, a resin formed product is obtained from the thermoplastic resin 3 after the sequential process of a vacuum step, a preliminary heating step, a filling step, and a cooling and removing step as follows.

When manufacturing a resin formed product, in the first place, as the vacuum step as shown in FIG. 4, the pressure vessel 61 is vacuated by the vacuum means 60, and the cavity 21 of the rubber-made mold 2 is decompressed to a vacuum state.

Next, as shown in the same drawing, as the preliminary heating step, the resin solid material 31 as the thermoplastic resin 3 is inserted and disposed in the heating and holding container 7 in the resin receiving state 701, and the resin solid material 31 is heated and melted by the outer heater 73 and the inner heater 74.

Also at the preliminary heating step, by using the electromagnetic wave generating means 4, the resin receiving part 22 provided in the mold 2 may be heated preliminarily.

Next, as shown in FIG. 5, as the filling step, the heating and holding container 7 is inverted to the resin discharging state 702, and the semi-melted resin solid material 31 (thermoplastic resin 3) in the heating and holding container 7 is dropped into the resin receiving part 22 provided in the mold 2.

Consequently, as shown in FIG. 6, the thermoplastic resin 3 disposed in the resin receiving part 22 flows down by its own gravity into the cavity 21 through the casting gate 23. At this time, the heating and holding container 7 is inverted again to the resin receiving state 701, and load is applied to the thermoplastic resin 3 by the load part 721 in the container slide part 72.

After the thermoplastic resin 3 is cast into the cavity 21, vacuating operation of the vacuum means 60 is stopped, and the pressure vessel 61 is opened to the atmosphere, and the inside of the pressure vessel 61 is made to have atmospheric pressure. As a result, the thermoplastic resin 3 cast in the cavity 21 permeates sufficiently into all narrow gaps in the cavity 21.

As a result, the cavity 21 in the vacuum state is filled with the melted thermoplastic resin 3.

In the embodiment, at the preliminary heating step and the filling step, electromagnetic waves having an intensity peak in wavelength region of 0.78 to 2 μm are irradiated continuously to the surface of the mold 2 from the electromagnetic wave generating means 4.

Hence, the thermoplastic resin 3 flowing down into the cavity 21 from the resin receiving part 22 is suppressed from declining in temperature by the near-infrared ray.

A near-infrared ray is irradiated to the thermoplastic resin 3 flowing in the cavity 21 through the mold 2. When the melted thermoplastic resin 3 is exposed to the near-infrared ray, the viscosity is prevented from becoming higher than 5000 Poise.

When filling the cavity 21 with the thermoplastic resin 3, due to difference in properties between the rubber for forming the mold 2 and the thermoplastic resin 3, the thermoplastic resin 3 may be heated more in comparison with the rubber-made mold 2.

Hence, in the process until the cavity 21 is fully filled with the thermoplastic resin 3, the temperature of the thermoplastic resin 3 in the cavity 21 is kept higher than the temperature of the mold 2. Since the cavity 21 is in the vacuum state, the thermoplastic resin 3 can permeate sufficiently into the entire cavity 21.

At the cooling and removing step, the thermoplastic resin 3 in the cavity 21 is cooled, and a resin formed product is manufactured, and the mold 2 is opened, and the manufactured resin formed product is taken out from the cavity 21.

In the embodiment, the manufactured resin formed product is cooled in air in the cavity 21 of the mold 2, and is taken out from the cavity 21. At this time, since the thermoplastic resin 3 is heated selectively, the temperature of the mold 2 is kept lower than the temperature of the thermoplastic resin 3. Hence, the required time for cooling the resin formed product may be shortened.

Besides, since the temperature of the mold 2 is kept low, deterioration of the mold 2 may be suppressed, and the durability of the mold 2 may be enhanced.

In the embodiment, the ABS resin is used as the thermoplastic resin 3. As the thermoplastic resin 3, other thermoplastic resin 3 may be used as far as the near-infrared ray irradiated to the surface of the mold 2 is not absorbed in the mold 2, and the transmitted near-infrared ray may be absorbed.

Hence, according to the resin forming method of the embodiment, the thermoplastic resin 3 in the cavity 21 can be heated selectively from the rubber-made mold 2, and the thermoplastic resin 3 may permeate sufficiently into the cavity 21. As a result, a favorable resin formed product excellent in surface appearance may be formed.

In the resin forming method of the present invention, as mentioned above, when filling the cavity 21 of the mold 2 with the thermoplastic resin 3, it is possible to fill by making use of the own gravity of the thermoplastic resin 3 or the own gravity of the load part 721. Hence, large pressure is not applied to the thermoplastic resin 3, and the completed resin formed product is almost free from residual stress. Hence, the chemical resistance, heat resistance, and other characteristics of the resin formed product may be enhanced outstandingly.

In the resin forming method of the embodiment, the mold 2 is formed of rubber capable of deforming elastically. Hence, in the mold 2, if so-called under-cut shape is formed (a shape partly interfering with a part of the mold 2 when taking out the manufactured resin formed product after manufacturing), by elastically deforming this portion of under-cut shape, the completed resin formed product may be taken out by force. As a result, in the mold 2 having such under-cut shape, so-called slide mechanism is not needed, and the structure may be simplified.

Embodiment 4

Figure 8:
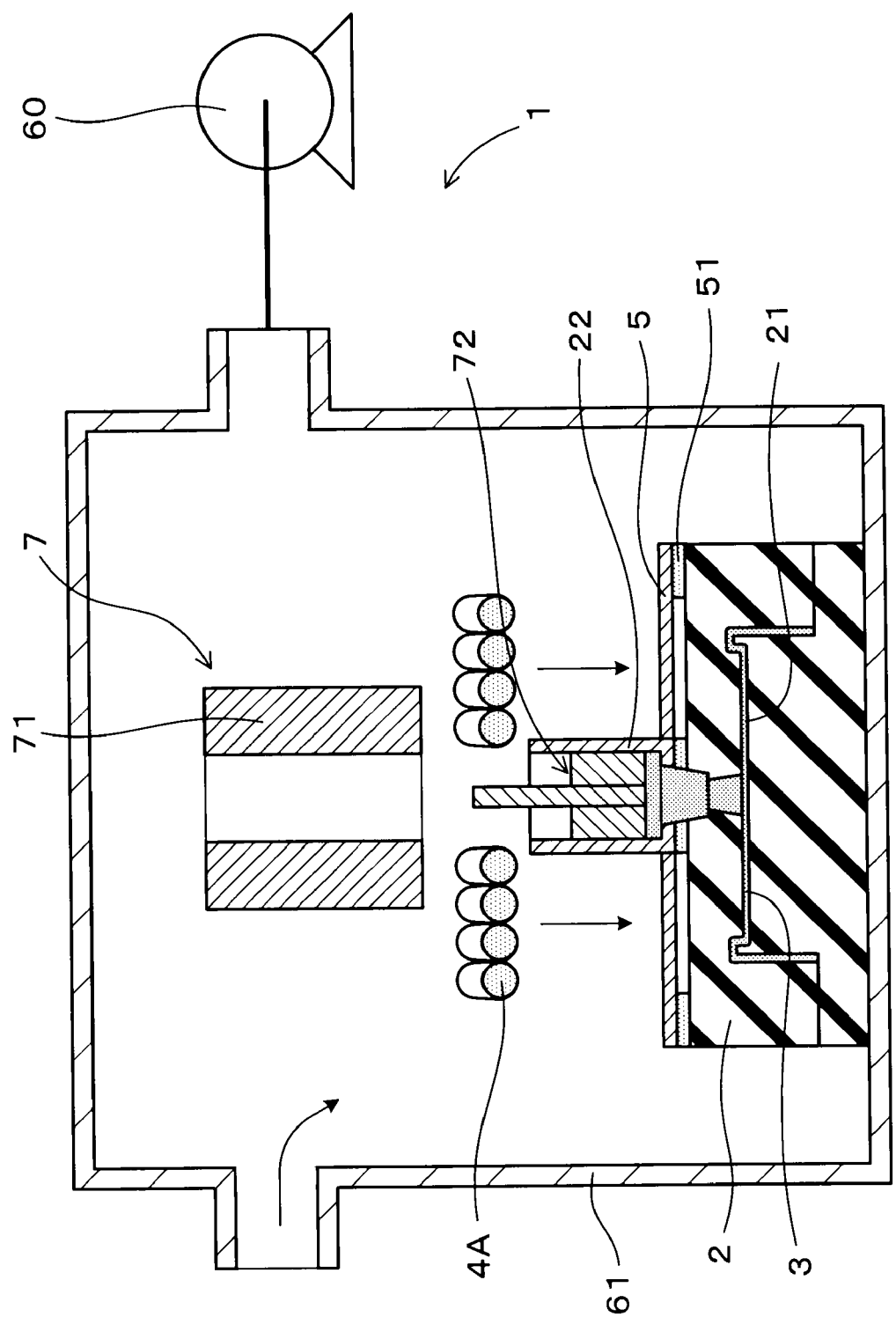
FIG. 8 is an explanatory diagram of the resin forming apparatus in which the mold is filled with the thermoplastic resin in embodiment 4.

The resin forming apparatus 1 of the embodiment includes, as shown in FIG. 8, electromagnetic wave generating means 4A for outputting electromagnetic waves having an intensity peak in wavelength region of 0.78 to 2 μm, and a filter 5 for decreasing the transmission amount of electromagnetic waves exceeding 2 μm in wavelength. This filter 5 is disposed between the output position of electromagnetic waves in the electromagnetic wave generating means 4A and the mold 2. The filter 5 in the embodiment is disposed on the surface of the mold 2 through a spacer 51. The filter 5 of the embodiment is formed of a quartz glass capable of decreasing the transmission amount of electromagnetic waves exceeding 2 μm in wavelength.

Other configuration of the resin forming apparatus 1 of the embodiment is the same as in embodiment 1.

At the filling step of the embodiment, the electromagnetic wave is output from the electromagnetic wave generating means 4A, and the transmission electromagnetic wave after passing through the filter 5 is irradiated to the thermoplastic resin 3 through the mold 2. At this time, due to difference in properties between the rubber for forming the mold 2 and the thermoplastic resin 3, the thermoplastic resin 3 is heated more than the rubber-made mold 2.

Electromagnetic waves exceeding 2 μm in wavelength may be contained among the electromagnetic waves having intensity peak in wavelength region of 0.78 to 2 μm, but by using the filter 5, the electromagnetic waves exceeding 2 μm in wavelength may be prevented from being irradiated to the mold 2 as far as possible.

As a result, the near-infrared ray of 2 μm or less in wavelength may be effectively irradiated to the thermoplastic resin 3 filled in the cavity 21 of the mold 2. Hence, without much heating the mold 2 by the near-infrared ray of 2 μm or less in wavelength, the thermoplastic resin 3 may be heated effectively. Other steps in the resin forming method of the embodiment are the same as in embodiment 3.

The embodiment hence brings about the same action and effect as embodiment 3

(Confirmation Test 1)

In confirmation test 1, the excellent action and effect of the resin forming method and resin forming apparatus 1 in embodiment 1 were confirmed.

In this confirmation test 1, the electromagnetic wave generating means 4 was a near-infrared ray halogen heater (Spot Heater Unit UL-SH-01 manufactured by Ushio Inc., rated voltage 100 V, power consumption 500 W, peak wavelength of light intensity about 1.2 μm). To plasticize the thermoplastic resin 3 before being cast into the mold 2, an injection molding machine (NN30B manufactured by Niigata Engineering) was used. To measure the temperature of the mold 2 and the temperature of thermoplastic resin 3, a thermocouple monitor was used.

Figure 9:
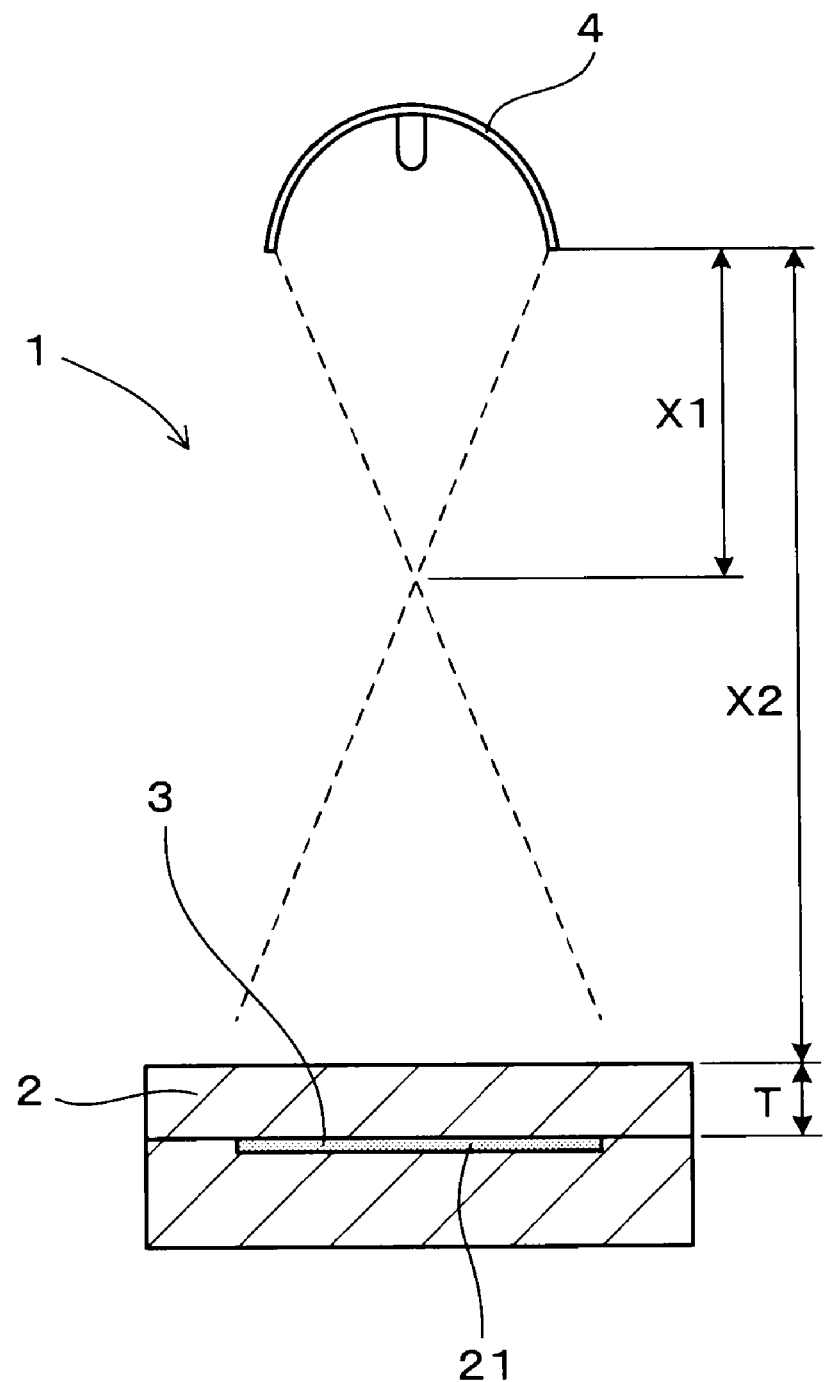
FIG. 9 is an explanatory diagram of the resin forming apparatus used in confirmation test 1.

As shown in FIG. 9, the near-infrared ray halogen heater was of a spot irradiation type for focusing by limiting the irradiated rays, and the focal length X1 from the output position to the ray is 75 mm. In the embodiment, the distance X2 from the output position of the ray to the surface of the mold is 225 mm, and the rays were crossed and irradiated to the mold 2.

As the thermoplastic resin 3 and mold 2, four invented articles 1 to 4 were used, and the near-infrared ray of about 1.2 μm in wavelength was irradiated from the electromagnetic wave generating means 4 to the surface of the mold 2, and the temperature of the mold 2 and the temperature of the thermoplastic resin 3 contained in the cavity 21 of the mold 2 were measured by using a thermocouple monitor.

In this confirmation test 1, the thermoplastic resin 3 in a melted state (about 250° C.) from the injection molding machine was cast into the mold 2 at room temperature (about 25° C.). To this mold 2, the near-infrared ray was irradiated from the electromagnetic wave generating means 4, and after 3 minutes, the temperature of the mold 2 and the temperature of the thermoplastic resin 3 were measured. During irradiation of the near-infrared ray, if the temperature of the thermoplastic resin 3 exceeded 250° C., the irradiation was stopped, and the temperature of the mold 2 at this time was measured.

The thermoplastic resin 3 and the mold 2 in the invented articles 1 to 4 were composed as follows.

(Invented article 1) Thermoplastic resin 3: black opaque ABS resin; mold 2: transparent silicone rubber of 12 mm in thickness T from the surface of the near-infrared ray irradiating side to the cavity 21.

(Invented article 2) Thermoplastic resin 3: black opaque ABS resin; mold 2: transparent silicone rubber of 25 mm in thickness T.

(Invented article 3) Thermoplastic resin 3: black opaque ABS resin; mold 2: translucent silicone rubber of 12 mm in thickness T.

(Invented article 4) Thermoplastic resin 3: transparent ABS resin; mold 2: transparent silicone rubber of 12 mm in thickness T.

The silicone rubber products of invented articles 1 to 4 were manufactured by Shin-Etsu Silicone, having JIS-A hardness of 40.

By way of comparison, instead of the electromagnetic wave generating means 4 for irradiating the near-infrared ray, a far-infrared ray halogen heater capable of irradiating the far-infrared ray was used (QIR100V 600WYD manufactured by Ushio Inc., rated voltage 100 V, power consumption 600 W, peak wavelength of light intensity about 2.5 μm) in comparative examples 1 and 2, which were measured in the same manner as in invented articles 1 to 4.

(Comparative example 1) Thermoplastic resin 3 and mold 2: same as in invented article 1.

(Comparative example 2) Thermoplastic resin 3 and mold 2: same as in invented article 2.

Results of measurement are shown in Table 1.

TABLE 1

| | invented article 1 | invented article 2 | invented article 3 | invented article 4 | comparative example 1 | comparative example 2 |
| --- | --- | --- | --- | --- | --- | --- |
| | near-infrared ray halogen heater | | | | far-infrared ray halogen heater | |
| temperature of thermoplastic resin (° C.) | 240 | 235 | 240 | 250 | 200 | 205 |
| temperature of mold (° C.) | 170 | 180 | 170 | 180 | 220 | 220 |

As shown in the table, in the invented articles 1 to 4 irradiated with the near-infrared ray, the temperature of the thermoplastic resin 3 was 235 to 250° C., but the temperature of the mold 2 was raised only to 170 to 180° C. In the comparative examples 1 and 2, the temperature of the thermoplastic resin 3 was 200 to 205° C., but the temperature of the mold 2 was raised to 220° C.

The thermoplastic resin 3 immediately after being cast into the cavity 21 of the mold 2 was cooled by the mold 2, and the temperature dropped to 150 to 180° C.

It is hence found that the thermoplastic resin 3 can be heated selectively from the mold 2, by irradiating the near-infrared ray to the surface of the mold 2 made of a silicone rubber (invented articles 1 to 4).

The reason why the mold 2 made of a silicone rubber was raised from ordinary temperature to 170 to 180° C. is estimated that the mold 2 has received heat energy by a heat transmission from the thermoplastic resin 3 filled in the cavity 21, and also that the mold 2 has absorbed a part of the near-infrared ray and is raised in temperature.

(Confirmation Test 2)

In this confirmation test, the excellent action and effect of the resin forming method and the resin forming apparatus 1 in embodiment 2 were confirmed.

used for measuring the temperature of the mold 2 and the temperature of the thermoplastic resin 3.

In this confirmation test, the thermoplastic resin 3 in a melted state (about 250° C.) from the injection molding machine was cast into the mold 2 at room temperature (about 25° C.). The electromagnetic wave was irradiated from the electromagnetic wave generating means 4 to the mold 2 through the filter 5, and after 3 minutes, the temperature of the mold 2 and the temperature of the thermoplastic resin 3 were measured. During irradiation of the electromagnetic waves, if the temperature of the thermoplastic resin 3 exceeded 250° C., the irradiation was stopped, and the temperature of the mold 2 at this time was measured.

Results of measurement are shown in Table 2.

TABLE 2

| filter | invented article 5 | invented article 6 | invented article 7 | invented article 8 | invented article 9 |
|---|---|---|---|---|---|
| | near-infrared ray halogen heater exist | | | | far-infrared ray halogen heater exist |
| temperature of thermoplastic resin (° C.) | 250 | 250 | 250 | 250 | 235 |
| temperature of mold (° C.) | 150 | 170 | 160 | 170 | 180 |

In this confirmation test, in the following invented articles 5 to 9, the electromagnetic waves were irradiated to the thermoplastic resin 3 through the filter 5 and the mold 2 from the electromagnetic wave generating means 4A, and the temperature of the mold 2 and the temperature of the thermoplastic resin 3 filled in the cavity 21 of the mold 2 were measured by using a thermocouple monitor.

The thermoplastic resin 3 and the mold 2 of the invented articles 5 to 9 were composed as follows.

(Invented article 5) Thermoplastic resin 3 and mold 2: same as in invented article 1.

(Invented article 6) Thermoplastic resin 3 and mold 2: same as in invented article 2.

(Invented article 7) Thermoplastic resin 3 and mold 2: same as in invented article 3.

(Invented article 8) Thermoplastic resin 3 and mold 2: same as in invented article 4.

(Invented article 9) Thermoplastic resin 3 and mold 2: same as in invented article 1.

The silicone rubber products of invented articles 5 to 9 were manufactured by Shin-Etsu Silicone, having JIS-A hardness of 40.

In the confirmation test, the invented articles 5 to 8 were heated by using the same near-infrared ray halogen heater as in confirmation test 1 as the electromagnetic wave generating means 4. The invented article 9 was tested by using a far-infrared ray halogen heater (QIR100V 600WYD manufactured by Ushio Inc., rated voltage 100 V, power consumption 600 W, peak wavelength of light intensity about 2.5 μm) as the electromagnetic wave generating means 4.

To plasticize the thermoplastic resin 3 before being cast into the mold 2, an injection molding machine was used (NN30B manufactured by Niigata Engineering).

As the filter 5, a quartz glass capable of decreasing the transmission amount of electromagnetic waves exceeding 2 μm in wavelength was used. The product of a quartz glass was HOMOSIL (trademark) of Shin-Etsu Quarts Products Ltd., and its thickness was 8 mm. A thermocouple monitor was As shown in the table, in the invented articles 5 to 8 irradiated with the near-infrared ray, the temperature of the thermoplastic resin 3 was 250° C. in all examples, but the temperature of the mold 2 was raised only to 150 to 170° C. In the invented article 9, the temperature of the thermoplastic resin 3 was 235° C., but the temperature of the mold 2 was raised only to 180° C.

The thermoplastic resin 3 immediately after being cast into the cavity 21 of the mold 2 was cooled by the mold 2, and the temperature dropped to 150 to 180° C.

It is hence found that the thermoplastic resin 3 can be heated selectively from the mold 2, by irradiating electromagnetic waves to the surface of the mold 2 made of a silicone rubber through the filter 5 (invented articles 5 to 9).

In the invented articles 5 to 8, the temperature of the thermoplastic resin 3 was raised more quickly than in the invented article 9. As a result, the thermoplastic resin 3 can be heated more effectively when the majority of electromagnetic waves to be irradiated to the mold 2 are the near-infrared rays of 2 μm or less in wavelength.

The reason why the mold 2 made of silicone rubber was raised from ordinary temperature to 150 to 180° C. is estimated that the mold 2 has received heat energy by heat transmission from the thermoplastic resin 3 filled in the cavity 21, and also that the mold 2 has absorbed a part of the near-infrared ray and is raised in temperature.

Embodiment 5

Figure 10:
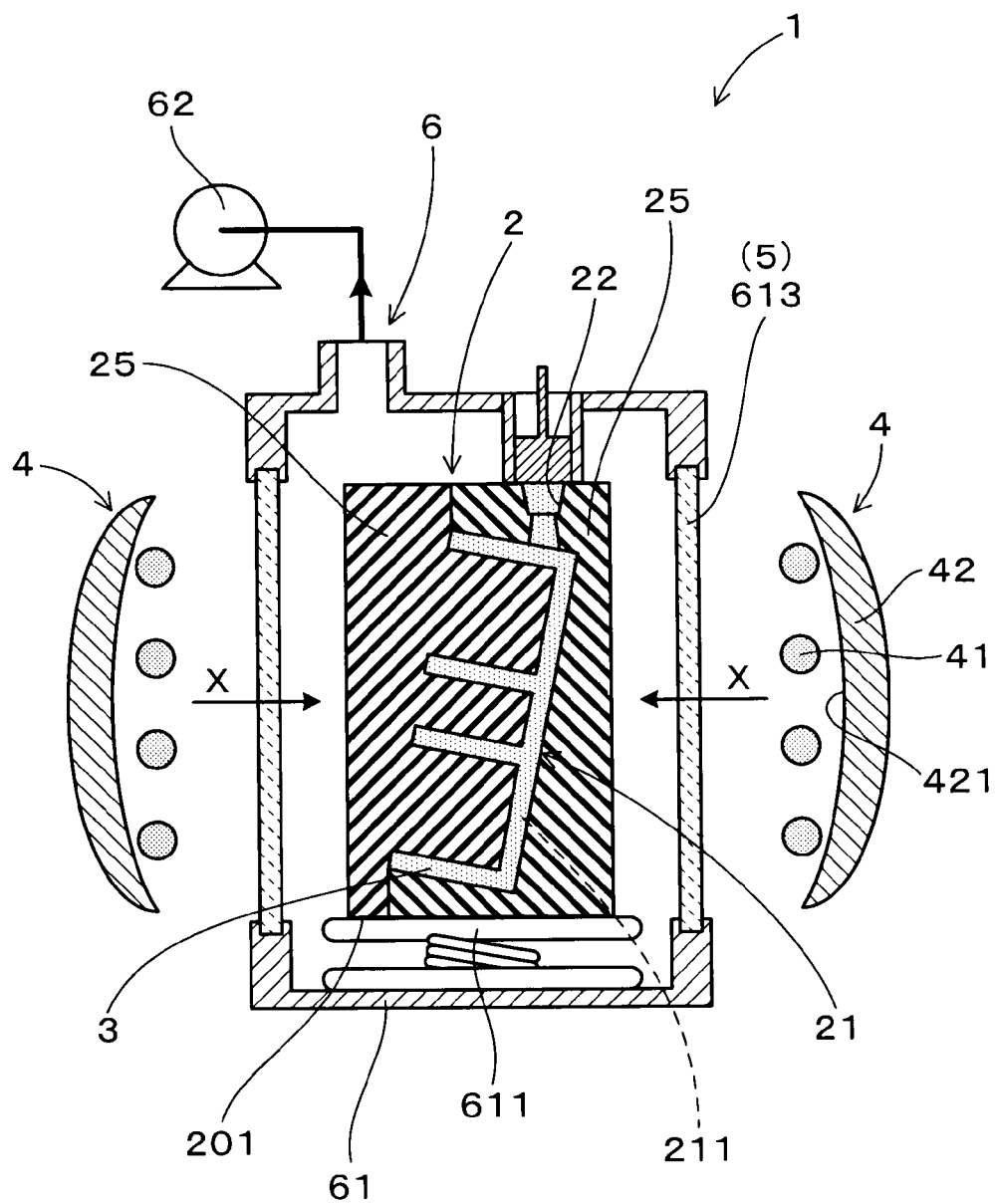
FIG. 10 is a sectional explanatory diagram of the resin forming apparatus in which the cavity of the mold is filled with the thermoplastic resin in embodiment 5.
Figure 11:
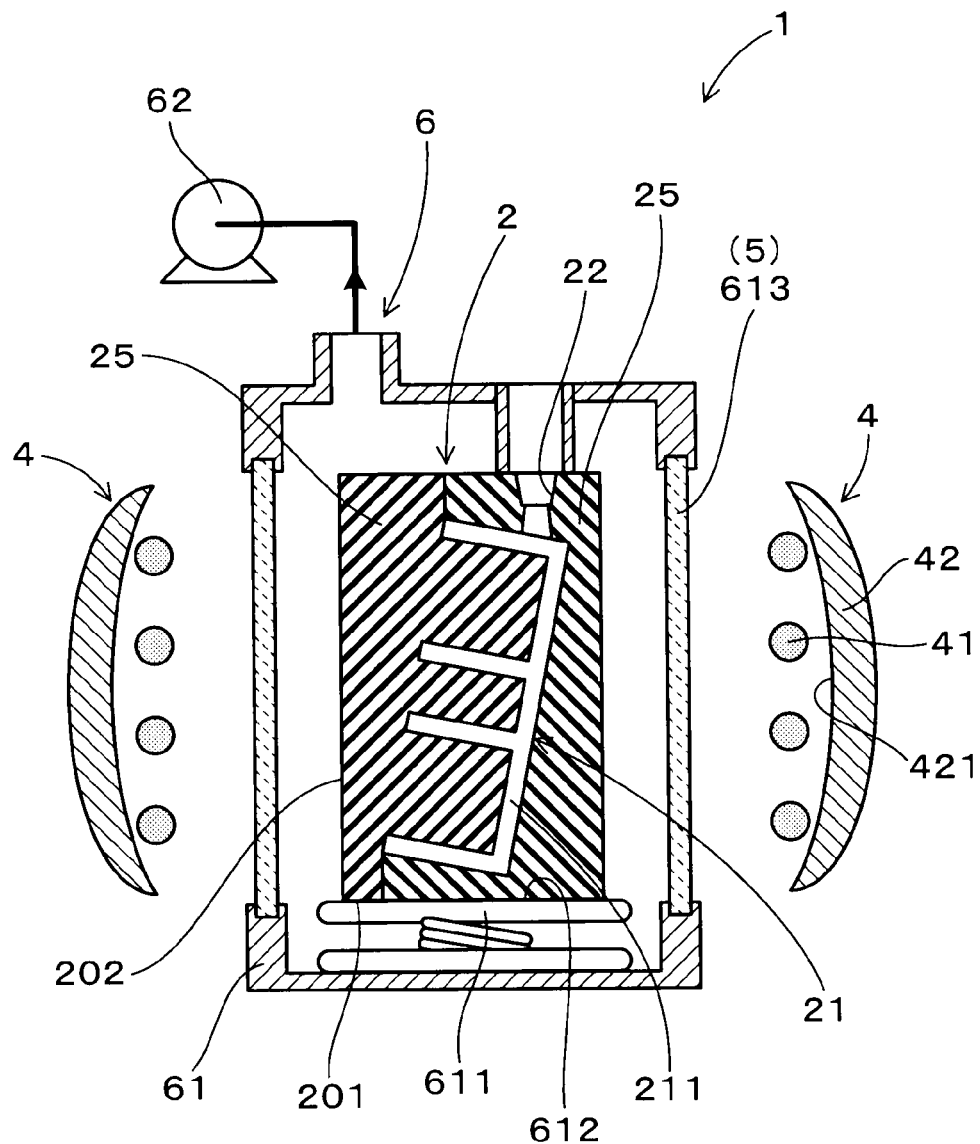
FIG. 11 is a sectional explanatory diagram of the resin forming apparatus before the cavity of the mold is filled with the thermoplastic resin in embodiment 5.

The resin forming apparatus 1 of the embodiment includes, as shown in FIG. 10 and FIG. 11, a rubber-made mold 2 forming a cavity 21 to be filled with a thermoplastic resin 3, electromagnetic wave generating means 4 for outputting electromagnetic waves having intensity peak in a wavelength region of 0.78 to 2 μm, a filter 5 disposed between the electromagnetic wave generating means 4 and the mold 2, for decreasing the transmission amount of electromagnetic waves exceeding 2 μm in wavelength, and vacuum means 6 for vacuating the cavity 21.

Figure 12:
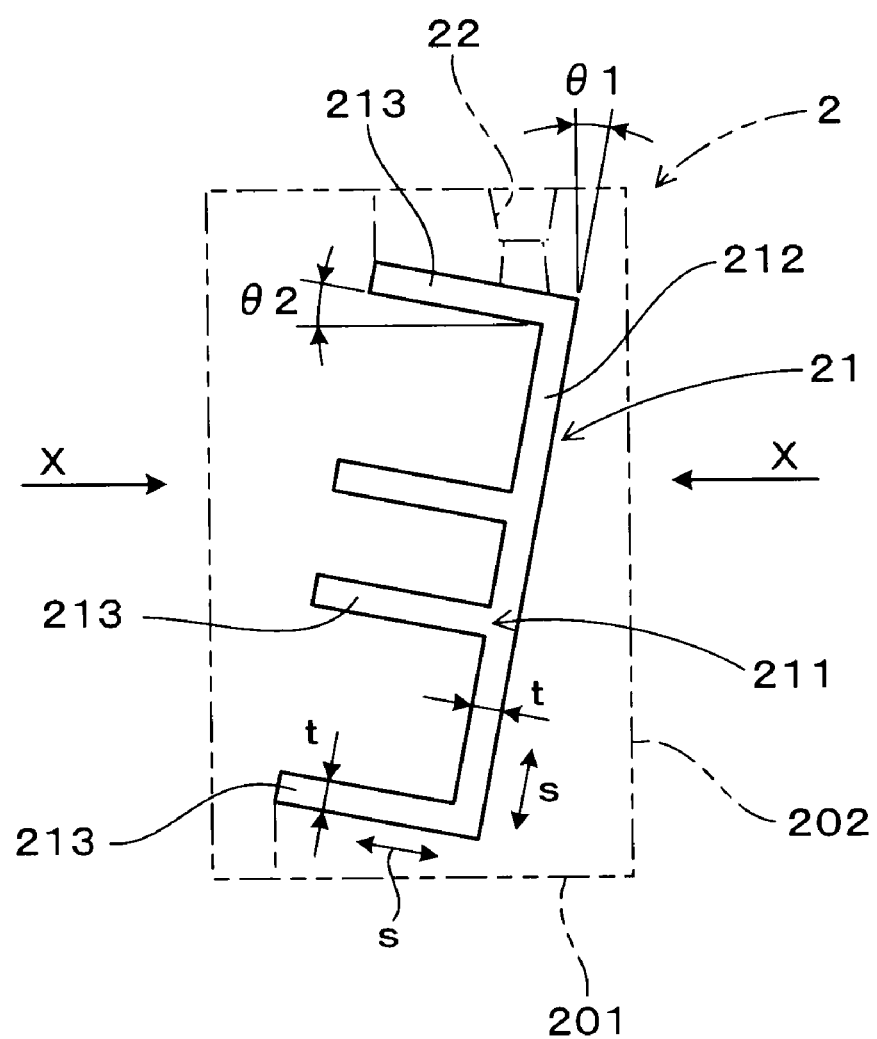
FIG. 12 is an explanatory diagram of a cavity forming state in the mold in embodiment 5.

As shown in FIG. 10 and FIG. 12, the cavity 21 of the embodiment is formed in a three-dimensional space formed of a plurality of plate-like spaces 211 crossed and coupled with each other, and each plate-like space 211 has a plane direction (s) forming its outline profile, and a thickness direction (t) perpendicular to the plane direction (s). When filling the cavity 21 with the thermoplastic resin 3, the electromagnetic wave generating means 4 is designed to irradiate the transmission electromagnetic waves after passing through the filter 5 to the thermoplastic resin 3 through the mold 2, and also to irradiate the transmission electromagnetic waves from an inclined direction to the plane direction (s) in each plate-like space 211. In FIG. 10 and FIG. 12, the irradiation direction of electromagnetic waves is indicated by X. FIG. 12 is an explanatory diagram of the forming state of the cavity 21 in the mold 2.

The resin forming apparatus 1 of the embodiment is explained below with reference to FIG. 10 to FIG. 14.

In the embodiment, the thermoplastic resin 3 is an ABS resin which is a noncrystalline thermoplastic resin, and (acrylonitrile butadiene styrene resin) and also a rubber modified thermoplastic resin.

The mold 2 of the embodiment is formed of silicone rubber, and the hardness of the silicone rubber is 25 to 80 as measured in JIS-A method. The mold 2 is fabricated by disposing a master model (hand-made piece or the like) of the resin formed product to be manufactured in the liquid silicone rubber, curing the silicone rubber, and taking out the master model from the cured silicone rubber.

The absorbance of electromagnetic waves (light) of 0.78 to 2 μm in wavelength (also called near-infrared ray) (the scale showing the absorption intensity to light of a specific wavelength) is larger in the ABS resin used as the thermoplastic resin 3 than in the silicone rubber used as the rubber-made mold 2.

As shown in FIG. 10, the electromagnetic wave generating means 4 of the embodiment has a generation source 41 of the electromagnetic wave (light), and a reflector 42 (reflection board) for guiding the electromagnetic wave from the generation source 41 into the direction of the mold 2. The reflector 42 is disposed behind the electromagnetic wave generation source 41 (opposite side of direction of disposing the mold 2), and has a curved reflection plane 421. The electromagnetic wave generating means 4 of the embodiment is designed to guide the majority of electromagnetic waves output from the electromagnetic wave generation source 41 into the direction of the mold 2 and the pressure vessel 61 by means of the reflector 42.

The electromagnetic wave generating means 4 of the embodiment is a near-infrared ray halogen heater, and the electromagnetic wave generation source 41 is a near-infrared ray halogen lamp having light intensity peak near 1.2 μm in the near-infrared ray region.

In the resin forming apparatus 1 of the embodiment, the melted thermoplastic resin 3 is cast into the cavity 21 of the mold 2, and by irradiating the near-infrared ray to the mold 2, viscosity of the melted thermoplastic resin 3 is prevented from becoming higher than 5000 Poise, and thereby a resin formed product is obtained.

As shown in FIG. 11, the vacuum means 6 of the embodiment includes a pressure vessel 61 accommodating the mold 2, and a vacuum pump 62 for vacuating the pressure vessel 61. The pressure vessel 61 includes a platform 611 for mounting the mold 2, and this platform 611 is formed to be elevatable, and the mounting height of the mold 2 can be adjusted. The mounting plane 612 of the platform 611 is formed in a horizontal direction, and is designed to support the mold 2 in a perpendicular direction.

As shown in the same diagram, the electromagnetic wave generating means 4 of the embodiment is disposed at a side in the outside of the pressure vessel 61. In the pressure vessel 61, at the position opposite to the electromagnetic wave generating means 4 (at the side of the pressure vessel 61 in the embodiment), a transparent window 613 is formed for passing the electromagnetic wave output from the electromagnetic wave generating means 4 into the pressure vessel 61. The electromagnetic wave irradiated from the electromagnetic wave generating means 4 is irradiated to the mold 2 through the transparent window 613. The transparent window 613 is formed at both sides of the pressure vessel 61, and the electromagnetic wave generating means 4 is disposed oppositely to both sides of the pressure vessel 61.

In the embodiment, the transparent window 613 of the pressure vessel 61 is formed of the filter 5. The filter 5 of the embodiment is a quartz glass capable of decreasing the transmission amount of electromagnetic waves exceeding 2 μm in wavelength.

As shown in FIG. 11, the mold 2 of the embodiment has a reference mounting plane 201 opposite to the platform 611 in the pressure vessel 61. The mold 2 has a rectangular solid shape, and the cavity 21 to be filled with the thermoplastic resin 3 is formed between a pair of rubber patterns 25.

As shown in FIG. 12, the plane direction (s) in all plate-like spaces 211 in the cavity 21 is formed in an inclined state to the reference mounting plane 201. The plate-like space 211 of the embodiment has a main plate-like space 212 forming a largest outline in the cavity 21, and a plurality of sub plate-like spaces 213 formed in a direction crossing the main plate-like space 212. The plurality of sub plate-like spaces 213 of the embodiment are coupled orthogonally to the main plate-like space 212.

Also as shown in FIG. 12, the main plate-like space 212 is formed at an inclination angle of θ1 of within 45 degrees (more specifically an inclination angle in a range of 1 to 30 degrees) to a side plane 202 orthogonal to the reference mounting plane 201 of the mold 2, and each sub plate-like space 213 is formed at an inclination angle of θ2 of within 45 degrees (more specifically an inclination angle in a range of 1 to 30 degrees) to the reference mounting plane 201 of the mold 2.

Figure 13:
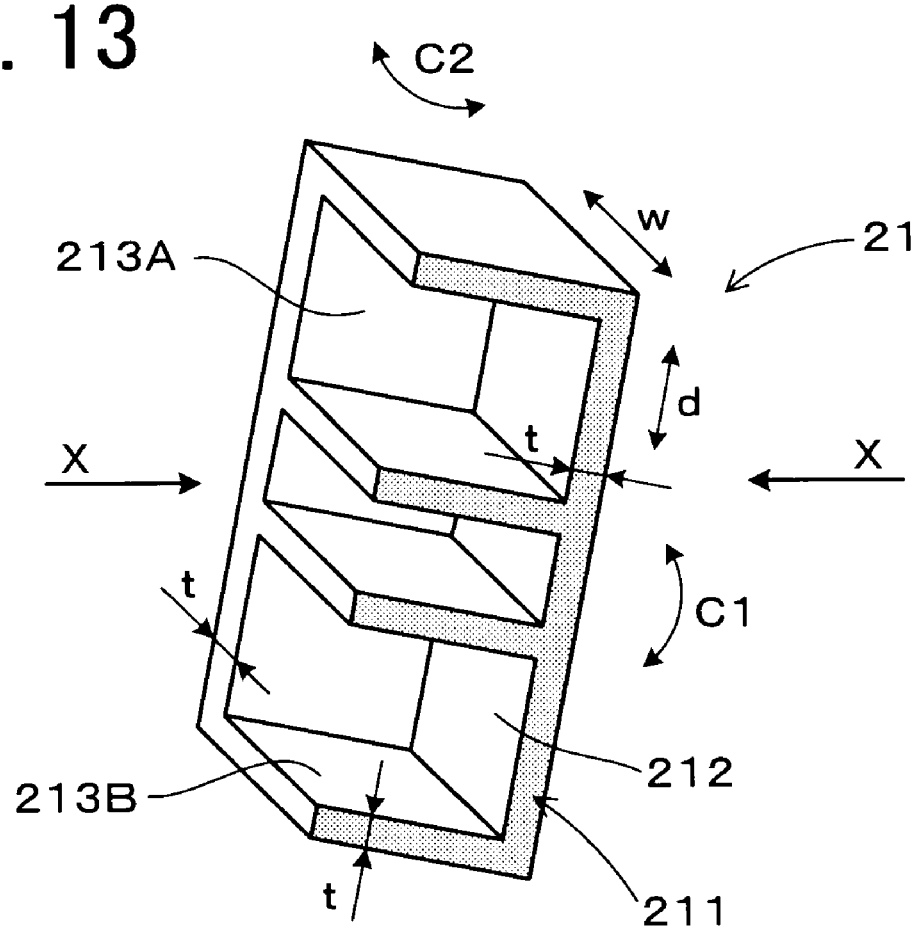
FIG. 13 is a perspective explanatory diagram of the cavity forming state in the mold in embodiment 5.

As shown in FIG. 13, in each plate-like space 211, the thickness dimension in the thickness direction (t) is formed smaller than the minimum dimension in the plane direction (s).

The sub plate-like space 213 in the embodiment is formed with the plane direction (s) directed in plural directions to the plane direction (s) of the main plate-like space 212. In the embodiment, in the longitudinal direction (d) in the plane direction (s) of the main plate-like space 212, a first sub plate-like space 213A standing up from the main plate-like space 212 toward the thickness direction (t) is formed, and in the lateral direction (w) in the plane direction (s) of the main plate-like space 212, a second sub plate-like space 213B standing up from the main plate-like space 212 toward the thickness direction (t) is formed. FIG. 13 is a perspective view for explaining the forming state of the cavity 21 in the mold 2.

As shown in the same drawing, the cavity 21 in the embodiment is formed by inclining the main plate-like space 212 in plural directions to the reference mounting plate 201 (or side plane 202). In the embodiment, the plane direction (s) of the main plate-like space 212 is formed by inclining in two directions, that is, a direction C1 rotating about the horizontal direction to the center, and a direction C2 rotating about the perpendicular direction to the center. Accordingly, the plane direction (s) of each sub plate-like space 213 is inclined and formed in two directions.

The master model is disposed in the liquid silicone rubber in an obliquely inclined state, and the silicone rubber is cured, and hence the cavity 21 inclined to the reference mounting plate 201 may be formed easily.

As shown in FIG. 10 and FIG. 12, the electromagnetic wave generating means 4 of the embodiment is set so that the electromagnetic irradiation direction X may be a horizontal direction to the pressure vessel 61 and the mold 2.

The cavity 21 of the embodiment is formed so that the plane direction (s) of the main plate-like space 212 may be inclined to the irradiation direction X of the electromagnetic wave by the electromagnetic wave generating means 4. As a result, the plane direction (s) of the plurality of sub plate-like spaces 213 is formed at an inclination to the irradiation direction X.

The mold 2 of the embodiment is formed so that its cavity 21 may be inclined to the reference mounting plane 201, and the plane direction (s) in each plate-like space 211 is formed at an inclination to the irradiation direction X, and is mounted on the platform 611.

As shown in FIG. 10 and FIG. 12, a cast part 22 for casting the melted thermoplastic resin 3 in the cavity 21 is formed at the upper side of the mold 2 (the opposite side to the reference mounting plane 201). The cast part 22 of the embodiment is formed by communicating through the sub plate-like space 213.

Figure 14:
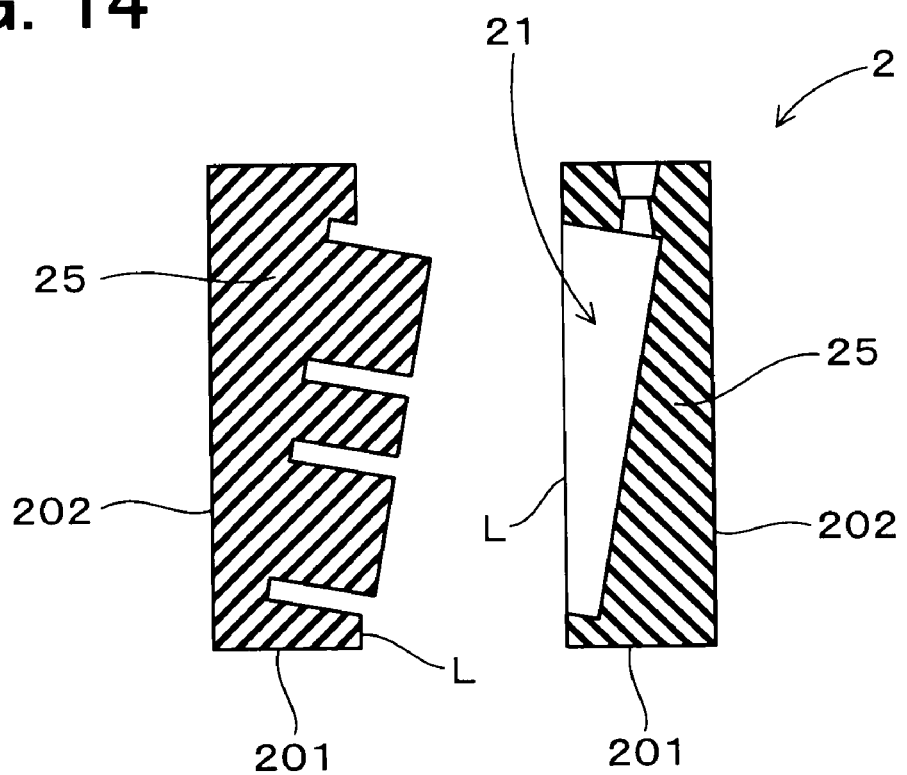
FIG. 14 is an explanatory diagram showing an opened state of other mold different in parting line in embodiment 5.

Since the mold 2 of the embodiment is formed of rubber, if so-called under-cut shape is formed in the manufactured resin formed product (a part interfering with the mold 2 when taking out the manufactured resin formed product from the cavity 21), by elastically deforming this portion of under-cut shape, the completed resin formed product may be taken out. As a result, a parting line may be set freely by overlapping the rubber patterns 25. FIG. 14 shows the mold 2 having the forming position of a parting line L positioned in the middle in the side direction of a pair of rubber patterns 25, in the mold 2.

By the same reason, the pattern opening direction (opening and closing direction) of a pair of rubber patterns 25 may be set freely.

By using this resin forming apparatus 1, the fabricating method of a resin formed product is explained below.

In the embodiment, a resin formed product is obtained from the thermoplastic resin 3 in the sequential process consisting of a vacuum step, a filling step, and a cooling and removing step as explained below.

When manufacturing a resin formed product, in the first place, as the vacuum step as shown in FIG. 11, the pressure vessel 61 is vacuated by the vacuum means 6, and the cavity 21 of the rubber-made mold 2 is decompressed to a vacuum state.

Next, as shown in FIG. 11, as the filling step, the melted thermoplastic resin 3 is cast into the cavity 21 from the cast part 22 of the mold 2.

After the thermoplastic resin 3 is cast into the cavity 21, evacuation by the vacuum means 6 is stopped, and the pressure vessel 61 is opened to the atmosphere, and the inside of the pressure vessels 61 is made to have atmospheric pressure. As a result, the thermoplastic resin 3 cast into the cavity 21 may permeate sufficiently into each plate-like space 211 entirely in the cavity 21.

In the embodiment, at the filling step, the electromagnetic wave generating means 4 irradiates the near-infrared ray having an intensity peak in wavelength region of 0.78 to 2 µm to the surface of the mold 2. At this time, in the mold 2 of the embodiment, the electromagnetic wave generating means 4 irradiates the near-infrared ray from an inclined direction to the plane direction (s) in each plate-like space 211.

Thus, the thermoplastic resin 3 flowing down from the cast part 22 into the cavity 21 is prevented from declining in temperature by the near-infrared ray.

The thermoplastic resin 3 flowing in the cavity 21 is irradiated with the near-infrared ray through the mold 2. The melted thermoplastic resin 3 is irradiated with the near-infrared ray, and is hence prevented from becoming the viscosity higher than 5000 Poise.

When filling the cavity 21 with the thermoplastic resin 3, due to difference in properties between the rubber for forming the mold 2 and the thermoplastic resin 3, the thermoplastic resin 3 can be heated more than the rubber-made mold 2. Hence, the thermoplastic resin 3 can be heated to a higher temperature than the rubber-made mold 2.

Hence, in the process until the cavity 21 is fully filled with the thermoplastic resin 3, the temperature of the thermoplastic resin 3 in the cavity 21 is kept higher than the temperature of the mold 2. Since the cavity 21 is in the vacuum state, the thermoplastic resin 3 can permeate sufficiently into the entire cavity 21.

At the subsequent cooling and removing step, the thermoplastic resin 3 in the cavity 21 is cooled, and a resin formed product is manufactured, and the mold 2 is opened, and the manufactured resin formed product is taken out from the cavity 21.

In the embodiment, the manufactured resin formed product is cooled in air in the cavity 21 of the mold 2, and is taken out from the cavity 21. At this time, since the thermoplastic resin 3 is heated selectively, the temperature of the mold 2 is kept lower than the temperature of the thermoplastic resin 3. Hence, the required time for cooling the resin formed product may be shortened.

In addition, since the temperature of the mold 2 is kept low, deterioration of the mold 2 may be suppressed, and the durability of the mold 2 may be enhanced.

The electromagnetic waves output from the electromagnetic wave generating means 4 contain electromagnetic waves exceeding 2 µm in wavelength, but by using the filter 5, the electromagnetic waves exceeding 2 µm in wavelength may be prevented from being irradiated to the mold 2 as far as possible. Hence, the near-infrared ray of 2 µm or less in wavelength may be effectively irradiated to the thermoplastic resin 3 contained in the cavity 21 of the mold 2. Hence, the thermoplastic resin 3 may be heated effectively, while the mold 2 is not heated so much, by the near-infrared ray of 2 µm or less in wavelength.

Further, the cavity 21 of the mold 2 of the embodiment is not formed in a simple plane space, but is formed in a three-dimensional space formed of a plurality of plate-like spaces 211, crossed and coupled with each other, having the plane direction (s) and the thickness direction (t). In the embodiment, when filling the cavity 21 with the thermoplastic resin 3, the electromagnetic wave generating means 4 irradiates the near-infrared ray to the plane direction (s) in each plate-like space 211 from an inclined direction. As a result, the near-infrared ray of 2 µm or less in wavelength may be irradiated entirely to all of the plate-like spaces 211 for forming the cavity 21 effectively. Accordingly, the temperature of the thermoplastic resin 3 may be kept high in the entire cavity 21.

In the embodiment, the thermoplastic resin 3 is the ABS resin. The thermoplastic resin 3 is not limited to this example, other thermoplastic resin 3 may be used as far as it is capable of absorbing the transmission near-infrared ray not absorbed in but passing through the mold 2 when the near-infrared ray is irradiated to the surface of the mold 2.

Accordingly, by the resin forming apparatus 1 of the embodiment, the thermoplastic resin 3 in the cavity 21 can be selectively heated from the rubber-made mold 2, and the thermoplastic resin 3 may permeate sufficiently into the entire cavity 21. As a result, a favorable resin formed product excellent in surface appearance may be obtained.

In the resin forming apparatus 1 of the embodiment, when filling the cavity 21 of the mold 2 with thermoplastic resin 3, it is possible to fill by making use of the own gravity of the thermoplastic resin 3. Hence, excessive pressure is not applied to the thermoplastic resin 3, and the manufactured resin formed product is almost free from residual stress. Hence, the resin formed product is substantially enhanced in chemical resistance, heat resistance, and other properties.

Embodiment 6

This embodiment shows various specific examples of the irradiation direction X of electromagnetic waves by the electromagnetic wave generating means 4 from a direction inclined to the plane direction (s) in each plate-like space 211 of the cavity 21 of the mold 2.

Figure 15:
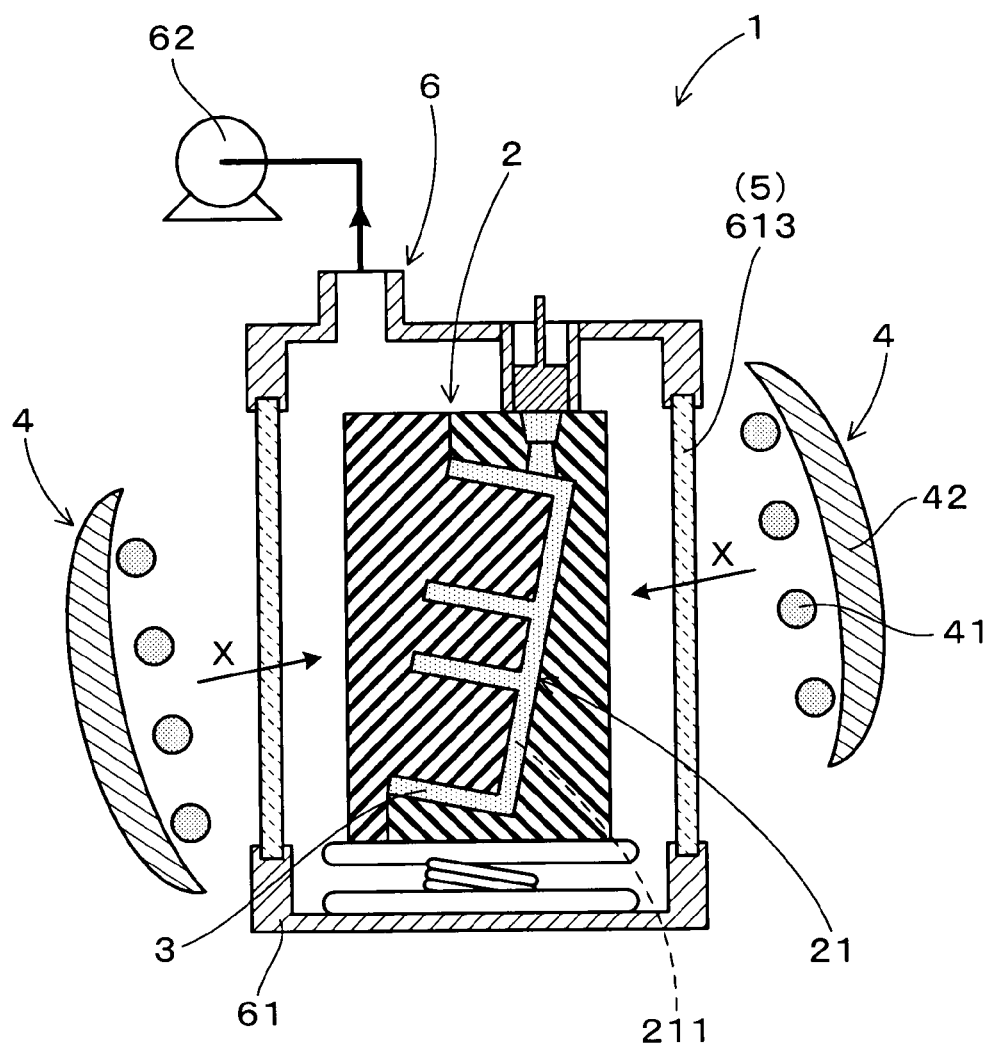
FIG. 15 is a sectional explanatory diagram of the resin forming apparatus in embodiment 6.

As a specific example, as shown in FIG. 15, the electromagnetic wave generating means 4 may irradiate electromagnetic waves from an oblique side direction of the mold 2 mounted on the platform 611. In this example, by the electromagnetic wave generating means 4 for outputting electromagnetic waves from both sides of the pressure vessel 61, the electromagnetic wave irradiation direction X by the electromagnetic wave generation source 41 and the reflector 42 are inclined to the transparent window 613 at the side of the pressure vessel 61. In this case, by inclining the electromagnetic wave irradiation direction X by the electromagnetic wave generating means 4 to the mold 2, the state of irradiating electromagnetic waves from a direction inclined to the plane direction (s) in each plate-like space 211 may be formed easily.

Figure 16:
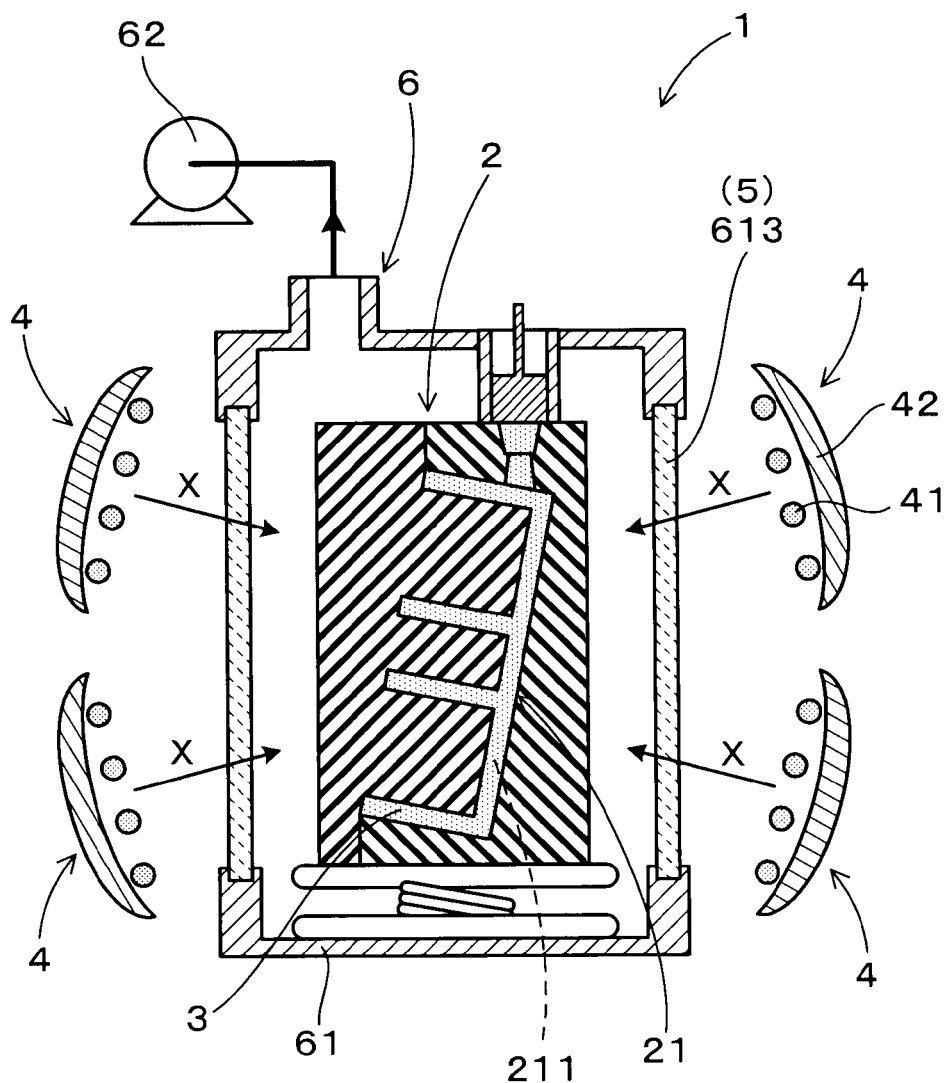
FIG. 16 is a sectional explanatory diagram of other resin forming apparatus in embodiment 6.

Further, as shown in FIG. 16, in the resin forming apparatus 1, a plurality of electromagnetic wave generating means 4 may be used, and the electromagnetic wave irradiation direction X of the electromagnetic wave by the electromagnetic wave generation source 41 and the reflector 42 may be different from each other in the plurality of electromagnetic wave generating means 4. In this case, by the plurality of electromagnetic wave generating means 4, electromagnetic waves may be irradiated to the mold 2 from plural directions, and the electromagnetic waves are more easily sent into all parts of the plate-like space 211 in the cavity 21 of the mold 2.

Figure 17:
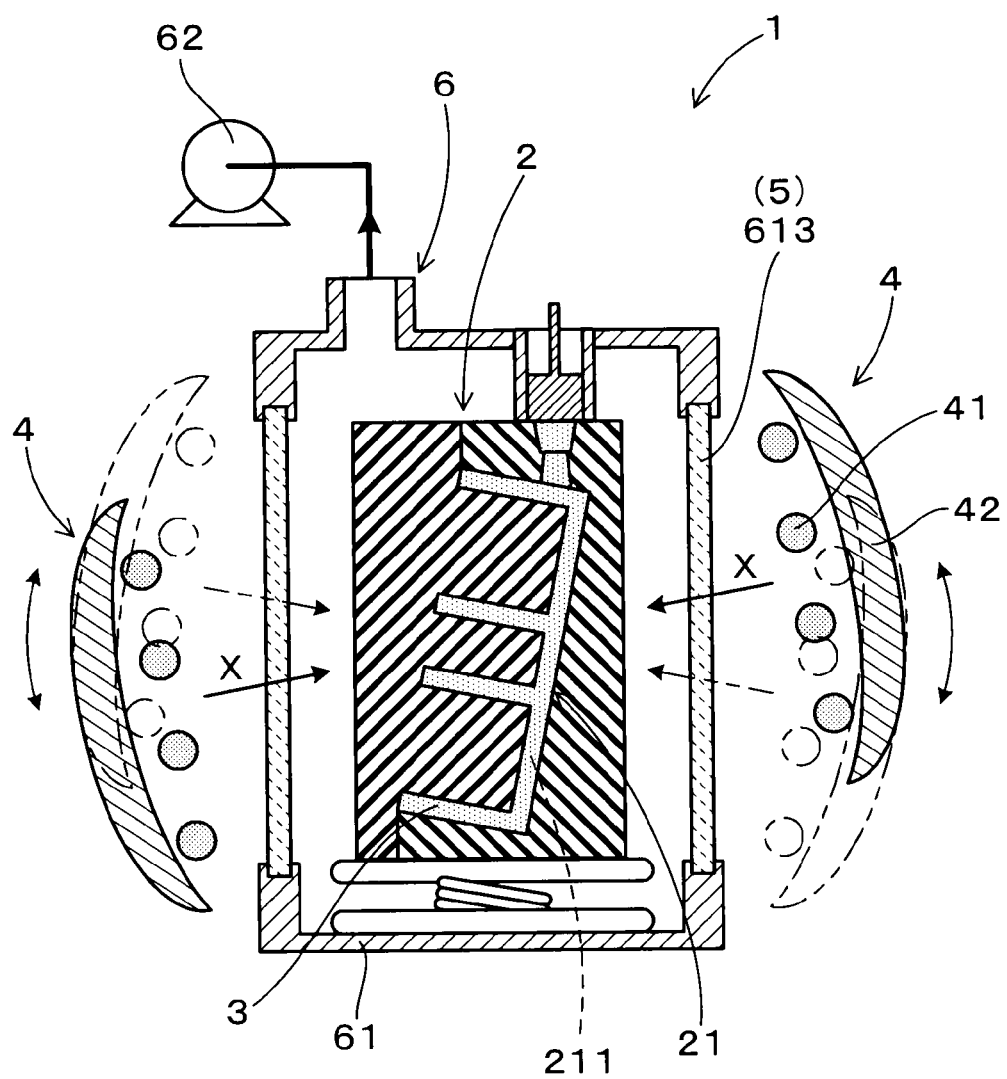
FIG. 17 is a sectional explanatory diagram of another resin forming apparatus in embodiment 6.

In other specific example, the mold 2 mounted on the platform 611 and the electromagnetic wave generating means 4 are relatively moved, and electromagnetic waves may be irradiated from a direction inclined to the plane direction (s) in each plate-like space 211. More specifically, as shown in FIG. 17, the irradiation direction X of electromagnetic waves by the electromagnetic wave generating means 4 disposed oppositely at both sides outside of the pressure vessel 61 may be formed in a variable state.

In this case, the electromagnetic wave generating means 4 may be configured so as to rotate the electromagnetic wave generation source 41 and the reflector 42 integrally, or only the reflector 42 may be formed to be rotatable. In this case, the irradiation direction X of electromagnetic waves may be changed freely, and the electromagnetic wave may be sent more easily toward the entire plate-like space 211 in the cavity 21 of the mold 2.

In this embodiment, too, other configuration is same as in embodiment 5, and same effect and action as in embodiment 5 may be obtained.

Embodiment 7

Figure 18:
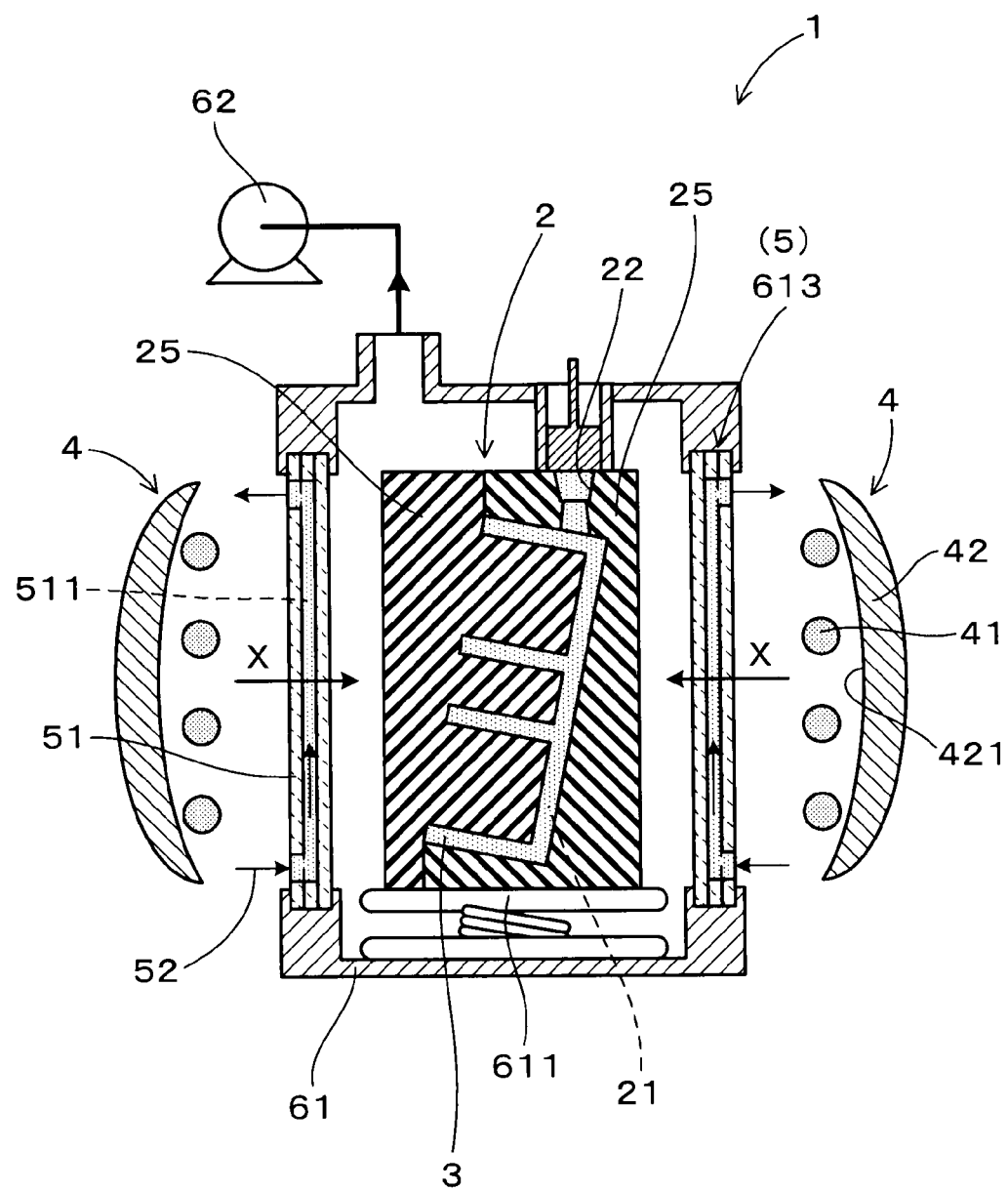
FIG. 18 is a sectional explanatory diagram of the resin forming apparatus in which the cavity of the mold is filled with the thermoplastic resin in embodiment 7.
Figure 19:
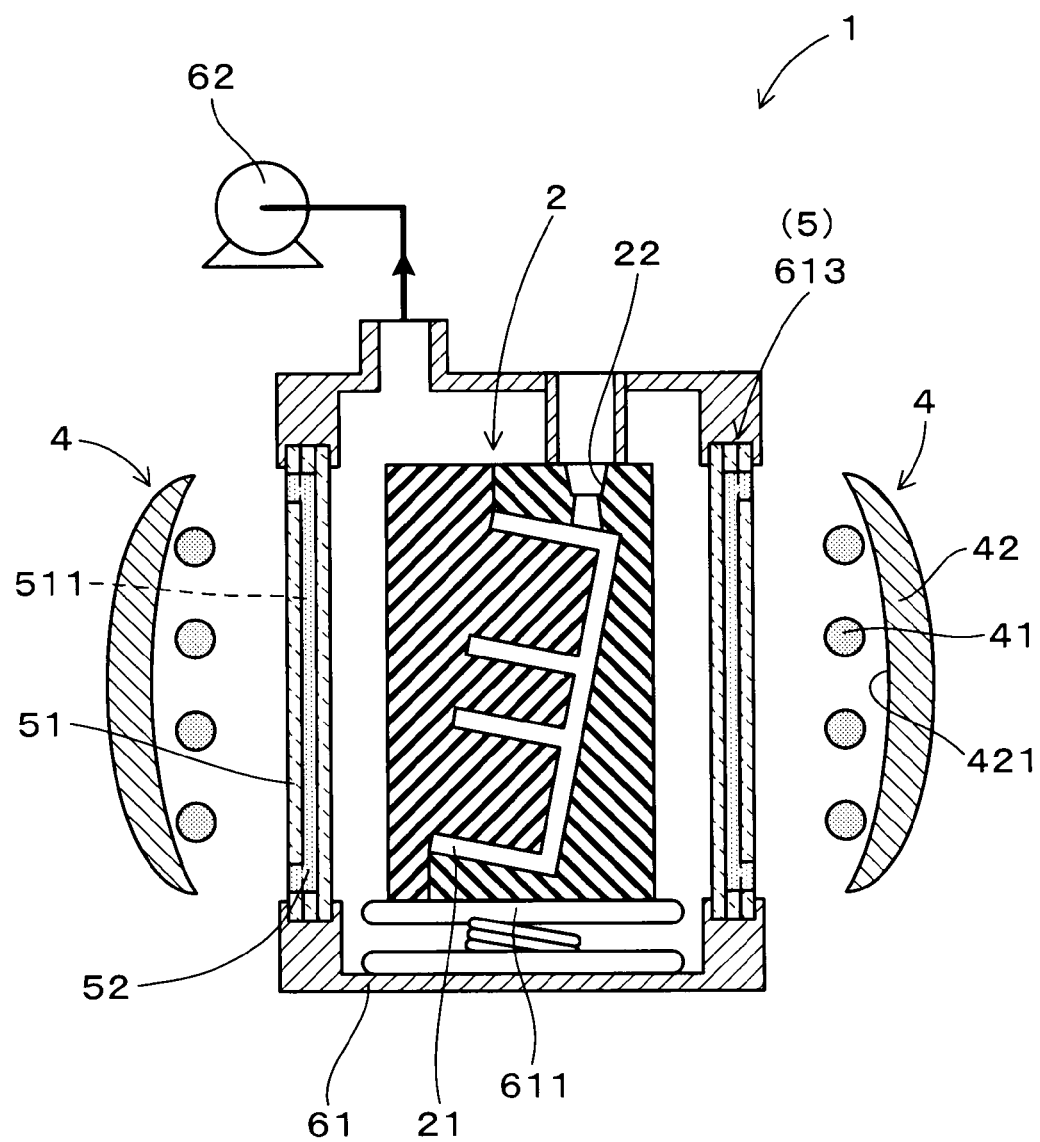
FIG. 19 is a sectional explanatory diagram of the resin forming apparatus before the cavity of the mold is filled with the thermoplastic resin in embodiment 7.

The resin forming apparatus 1 of the embodiment includes, as shown in FIG. 18 and FIG. 19, a rubber-made mold 2 forming a cavity 21 to be filled with a thermoplastic resin 3, electromagnetic wave generating means 4 for outputting electromagnetic waves of 0.78 to 4 µm in wavelength, and a filter 5 disposed between the electromagnetic wave generating means 4 and the mold 2 for decreasing the transmission amount of electromagnetic waves exceeding 2 µm in wavelength.

Figure 20:
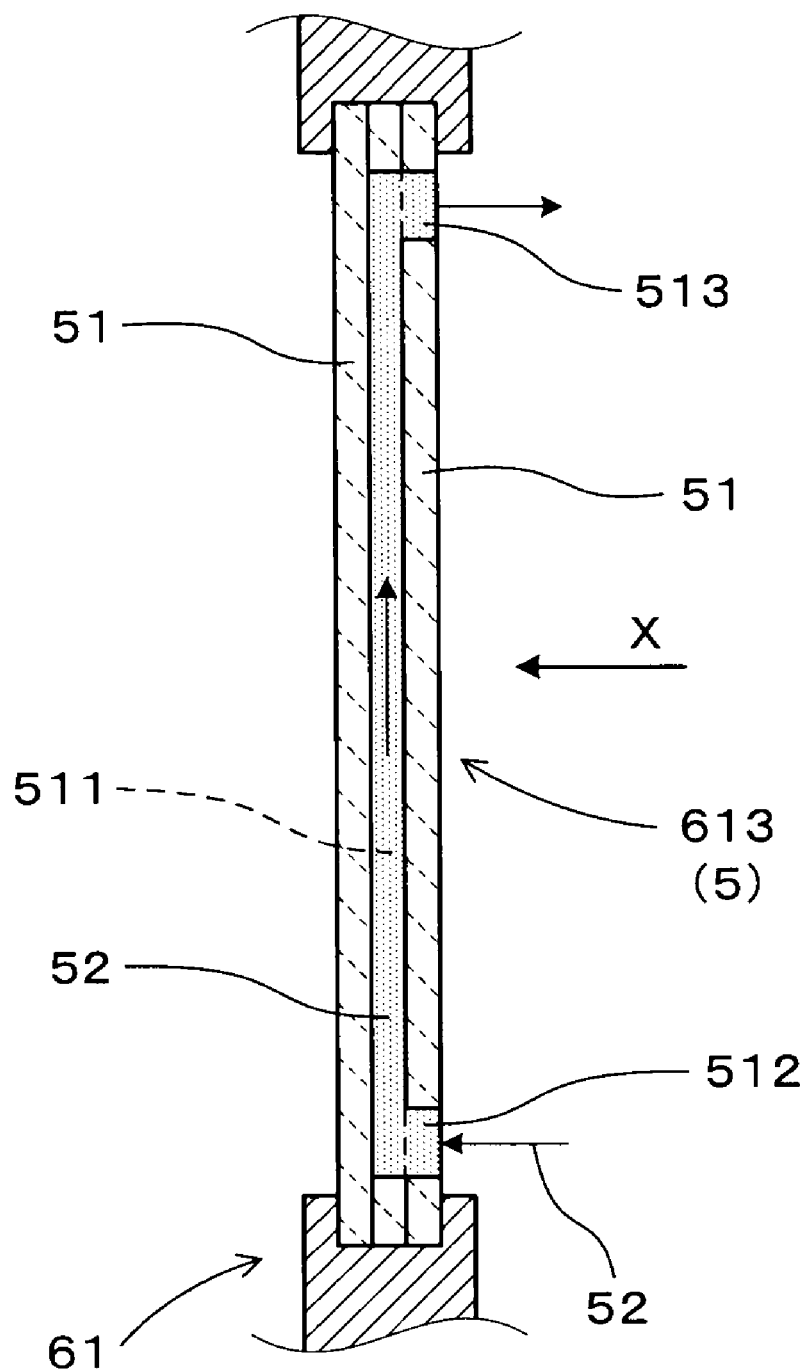
FIG. 20 is a sectional explanatory diagram around a filter in a pressure vessel in embodiment 7.

As shown in FIG. 20, the filter 5 has a filter water 52 contained in a gap 511 formed between transparent plates 51 of a transparent material. The filter 5 includes an inlet 512 through which the filter water 52 flows into the gap 511, and an outlet 513 through which the filter water 52 flows out from the gap 511. The resin forming apparatus 1 decreases the transmission amount of electromagnetic waves exceeding 2 µm in wavelength by the filter water 52, and is designed to exchange the filter water 52 through the inlet 512 and the outlet 513.

Further, as shown in FIG. 18, the electromagnetic wave generating means 4 is designed to heat the thermoplastic resin 3 by irradiating transmission electromagnetic waves after passing through the filter 5 to the thermoplastic resin 3 through the mold 2 when filling the cavity 21 with the thermoplastic resin 3. In FIG. 18 and FIG. 20, the irradiation direction of electromagnetic waves is indicated by symbol X.

The resin forming apparatus 1 of the embodiment is described specifically with reference to FIG. 18 to FIG. 24.

In the embodiment, the thermoplastic resin is the ABS resin (acrylonitrile butadiene styrene resin) which is noncrystalline thermoplastic resin, and a rubber modified thermoplastic resin.

The mold 2 of the embodiment is formed of a silicone rubber, and the hardness of the silicone rubber is 25 to 80 as measured in JIS-A method. The mold 2 is fabricated by disposing a master model (hand-made piece or the like) of the resin formed product to be manufactured in a liquid silicone rubber, curing the silicone rubber, and taking out the master model from the cured silicone rubber.

The absorbance of electromagnetic wave (light) of 0.78 to 2 µm in wavelength (also called near-infrared ray) (the scale showing the absorption intensity to light of a specific wavelength) is larger in the ABS resin used as the thermoplastic resin 3 than in the silicone rubber used as the rubber-made mold 2.

As shown in FIG. 18, the electromagnetic wave generating means 4 of the embodiment has a generation source 41 of electromagnetic waves (light), and a reflector 42 (reflecting board) for guiding the electromagnetic wave from the generation source 41 into the direction of the mold 2. The reflector 42 is disposed behind the electromagnetic wave generation source 41 (opposite side of the direction of disposing the mold 2), and has a curved reflection plane 421. The electromagnetic wave generating means 4 of the embodiment is designed to guide the majority of electromagnetic waves irradiated from the electromagnetic wave generation source 41 into the direction of the mold 2 and the pressure vessel 61 by means of the reflector 42.

The electromagnetic wave generating means 4 of the embodiment is a near-infrared ray halogen heater, and the electromagnetic wave generation source 41 is a near-infrared ray halogen lamp having light intensity peak near 1.2 μm in the near-infrared ray region.

In the resin forming apparatus 1 of the embodiment, the melted thermoplastic resin 3 is cast into the cavity 21 of the mold 2, and by irradiating the near-infrared ray to the mold 2, viscosity of the melted thermoplastic resin 33 is prevented from becoming higher than 5000 Poise, and thereby a resin formed product is obtained.

As shown in FIG. 19, the resin forming apparatus 1 of the embodiment includes the pressure vessel 61 accommodating the mold 2, and a vacuum pump 62 for vacuating the pressure vessel 61. The resin forming apparatus 1 is designed to fill the cavity 21 vacuated by the vacuum pump 62 with the thermoplastic resin 3.

The pressure vessel 61 includes a platform 611 for mounting the mold 2, and this platform 611 is formed to be elevatable, and the mounting height of the mold 2 can be adjusted.

The electromagnetic wave generating means 4 of the embodiment is disposed at a side in the outside of the pressure vessel 61. In the pressure vessel 61, at the position opposite to the electromagnetic wave generating means 4 (at the side of the pressure vessel 61 in the embodiment), a transparent window 613 is formed for passing the electromagnetic wave output from the electromagnetic wave generating means 4 into the pressure vessel 61.

Or, as shown in FIG. 20, the filter 5 of the embodiment forms a transparent window 613 in the pressure vessel 61. This filter 5 has a gap 511 of about 1 mm in thickness formed between a pair of transparent plates 51 made of glass plates, and this gap 511 is filled with the filter water 52, and a water membrane is formed.

The electromagnetic wave generating means 4 is designed to irradiate the transmission electromagnetic wave after passing through the filter 5 to the mold 2, through the filter 5 as the transparent window 613 when filling the cavity 21 vacuated by the vacuum pump 62 with the thermoplastic resin 3.

The transparent window 613 by the filter 5 is formed at both sides of the pressure vessel 61, and the electromagnetic wave generating means 4 is disposed opposite to both sides of the pressure vessel 61.

Although not shown in the drawing, the resin forming apparatus 1 of the embodiment includes a water tank for storing the filter water 52, a water feed pump for supplying the filter water 52 in the water tank into the inlet 512 at the filter 5 through water feed piping, and a discharge piping for collecting the filter water 52 after temperature rise into the water tank from the outlet 513 in the filter 5.

The filter water 52 in the gap 511 at the filter 5 is designed to circulate to and from the water tank by means of the water feed pump.

Thus, through the inlet 512 and the outlet 513, the filter water 52 in the gap 511 is circulated sequentially, and a part of the electromagnetic wave irradiated from the electromagnetic wave generating means 4 is absorbed, and the filter water 52 can be exchanged earlier before the temperature of the filter water 52 becomes high.

Figure 21:
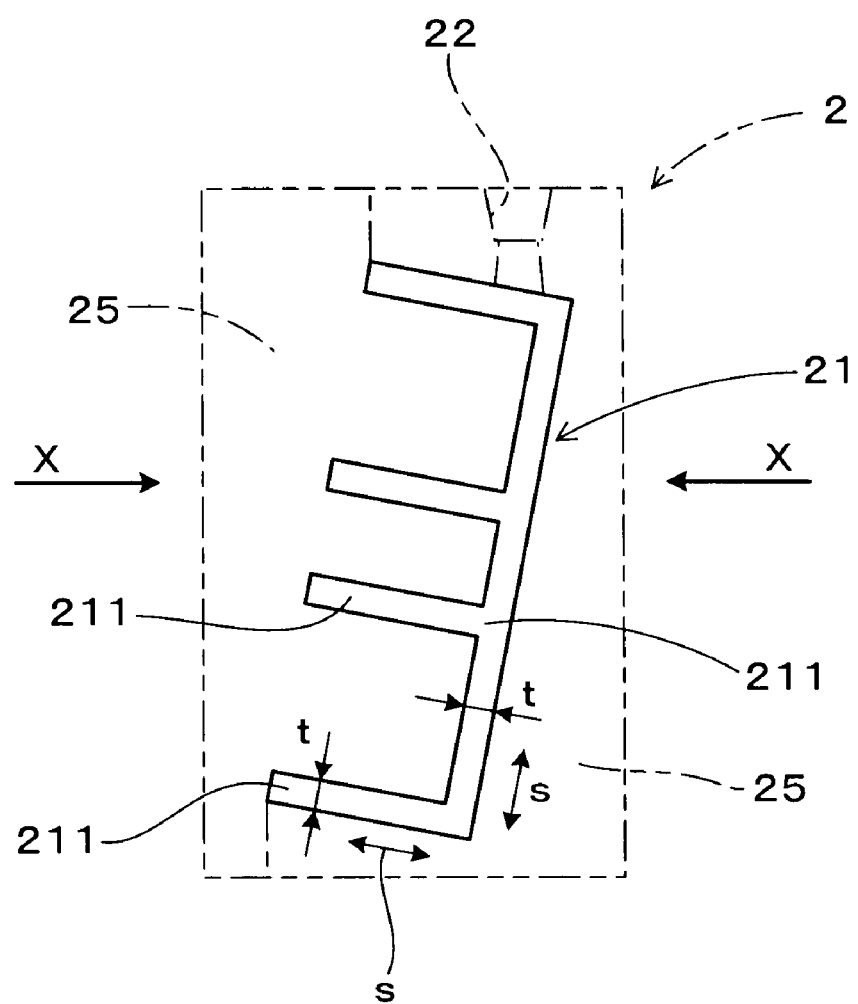
FIG. 21 is an explanatory diagram of the cavity forming state in the mold in embodiment 7.

As shown in FIG. 21, the cavity 21 of the embodiment is formed in a three-dimensional space formed of a plurality of plate-like spaces 211 crossed and coupled with each other, and each plate-like space 211 has a plane direction (s) forming its outline profile, and a thickness direction (t) perpendicular to the plane direction (s). The electromagnetic wave generating means 4 is designed to irradiate the transmission electromagnetic waves from an inclined direction to the plane direction (s) in each plate-like space 211 when filling the cavity 21 with the thermoplastic resin 3.

In addition, as shown in FIG. 18, a cast part 22 for casting the melted thermoplastic resin 3 into the cavity 21 is formed at the upper side of the mold 2. This cast part 22 is formed to communicate with the plate-like space 211.

Since the mold 2 of the embodiment is formed of rubber, if so-called under-cut shape is formed in the manufactured resin formed product (a part interfering with the mold 2 when taking out the manufactured resin formed product from the cavity 21), by elastically deforming this portion of under-cut shape, the completed resin formed product may be taken out. As a result, a parting line may be set freely by overlapping the rubber patterns 25 (see FIG. 21).

By using this resin forming apparatus 1, the fabricating method of a resin formed product is explained below.

In the embodiment, a resin formed product is obtained from the thermoplastic resin 3 in the sequential process consisting of a vacuum step, a filling step, and a cooling and removing step as explained below.

When manufacturing a resin formed product, in the first place, as the vacuum step as shown in FIG. 19, the pressure vessel 61 is vacuated by the vacuum pump 62, and the cavity 21 of the rubber-made mold 2 is decompressed to a vacuum state.

Next, as shown in FIG. 18, as the filling step, the melted thermoplastic resin 3 is cast into the cavity 21 from the cast part 22 of the mold 2.

At the filling step, the electromagnetic wave generating means 4 irradiates the electromagnetic waves of 0.78 to 4 μm in wavelength, and the transmission electromagnetic waves after passing through the filter 5 are irradiated to the thermoplastic resin 3 through the mold 2. The thermoplastic resin 3 flowing down from the cast part 22 into the cavity 21 is prevented from declining in temperature by the transmission electromagnetic waves.

The thermoplastic resin 3 flowing in the cavity 21 is irradiated with the transmission electromagnetic waves through the mold 2. The melted thermoplastic resin 3 is irradiated with the transmission electromagnetic waves, and is hence prevented from becoming the viscosity higher than 5000 Poise.

When filling the cavity 21 with the thermoplastic resin 3, due to difference in properties between the rubber for forming the mold 2 and the thermoplastic resin 3, the thermoplastic resin 3 can be heated more than the rubber-made mold 2. Hence, the thermoplastic resin 3 can be heated to a higher temperature than the rubber-made mold 2.

Hence, in the process until the cavity 21 is fully filled with the thermoplastic resin 3, the temperature of the thermoplastic resin 3 in the cavity 21 is kept higher than the temperature of the mold 2. Since the cavity 21 is in the vacuum state, the thermoplastic resin 3 can permeate sufficiently into the entire cavity 21.

Therefore, insufficient filling of the cavity 21 with the thermoplastic resin 3 is prevented, and a resin formed product excellent in surface appearance may be obtained.

After the thermoplastic resin 3 is cast into the cavity 21, evacuation by the vacuum pump 62 is stopped, and the pressure vessel 61 is opened to the atmosphere, and the inside of the pressure vessel 61 is made to have the atmospheric pressure. As a result, the thermoplastic resin 3 cast into the cavity 21 may permeate sufficiently into each plate-like space 211 entirely in the cavity 21.

At the subsequent cooling and removing step, the thermoplastic resin 3 in the cavity 21 is cooled, and a resin formed product is manufactured, and the mold 2 is opened, and the manufactured resin formed product is taken out from the cavity 21.

In the embodiment, the manufactured resin formed product is cooled in air in the cavity 21 of the mold 2, and is taken out from the cavity 21. At this time, since the thermoplastic resin 3 is heated selectively, the temperature of the mold 2 is kept lower than the temperature of the thermoplastic resin 3. Hence, the required time for cooling the resin formed product may be shortened.

In addition, since the temperature of the mold 2 is kept low, deterioration of the mold 2 may be suppressed, and the durability of the mold 2 may be enhanced.

The electromagnetic waves output from the electromagnetic wave generating means 4 of the embodiment contain electromagnetic waves exceeding 2 μm in wavelength, but by using the filter 5, the electromagnetic waves exceeding 2 μm in wavelength may be prevented from being irradiated to the mold 2 as far as possible. Hence, the near-infrared ray of 2 μm or less in wavelength may be effectively irradiated to the thermoplastic resin 3 contained in the cavity 21 of the mold 2. Hence, the thermoplastic resin 3 may be heated effectively, while the mold 2 is not heated so much, by the near-infrared ray of 2 μm or less in wavelength.

Further, in the embodiment, the filter 5 has a filter water 52 contained in a gap 511 formed between transparent plates 51. The electronic wave output from the electromagnetic wave generating means 4 passes through the water membrane of the filter water 52, and the transmission amount of electromagnetic waves exceeding 2 μm in wavelength is decreased, and the transmission electromagnetic waves passing through the filter water 52 is irradiated to the thermoplastic resin 3 through the mold 2.

Hence the filer 5 for decreasing the transmission amount of electromagnetic waves exceeding 2 μm in wavelength may be formed easily.

The filter water 52 may circulate through the inlet 512 and outlet 513 formed in the filter 5. Hence, if the temperature of the filter water 52 in the gap 511 is raised by absorbing a part of the electromagnetic waves irradiated from the electromagnetic wave generating means 4, the filter water 52 after this temperature rise may be exchanged with the filter water 52 of lower temperature.

Hence, the temperature rise of the filter 5 may be effectively suppressed, and the cooling structure for the filter 5 may be realized in a simple structure.

Therefore, according to the resin forming apparatus 1 of the embodiment, the thermoplastic resin 3 in the cavity 21 may be heated selectively from the rubber-made mold 2, and the filter 5 for enhancing this heating effect may be formed simply by adding a cooling function.

As the filter 5, aside from a water membrane, a glass plate or the like capable of decreasing the transmission amount of electromagnetic waves exceeding 2 μm in wavelength may be used. In this case, however, the glass plate absorbs the electromagnetic wave, and is heated and expanded. Accordingly, in particular, when a filter made of such glass plate is used as a transparent window 613 of the pressure vessel 61, a special O-ring of heat resistance specification is needed in the portion for holding the glass plate, and the apparatus may be expensive and complicated.

In the embodiment, the thermoplastic resin 3 is the ABS resin. The thermoplastic resin 3 is not limited to this example, other thermoplastic resin 3 may be used as far as it is capable of absorbing the transmission electromagnetic wave not absorbed in but passing through the mold 2 when the transmission electromagnetic wave is irradiated to the surface of the mold 2.

Figure 22:
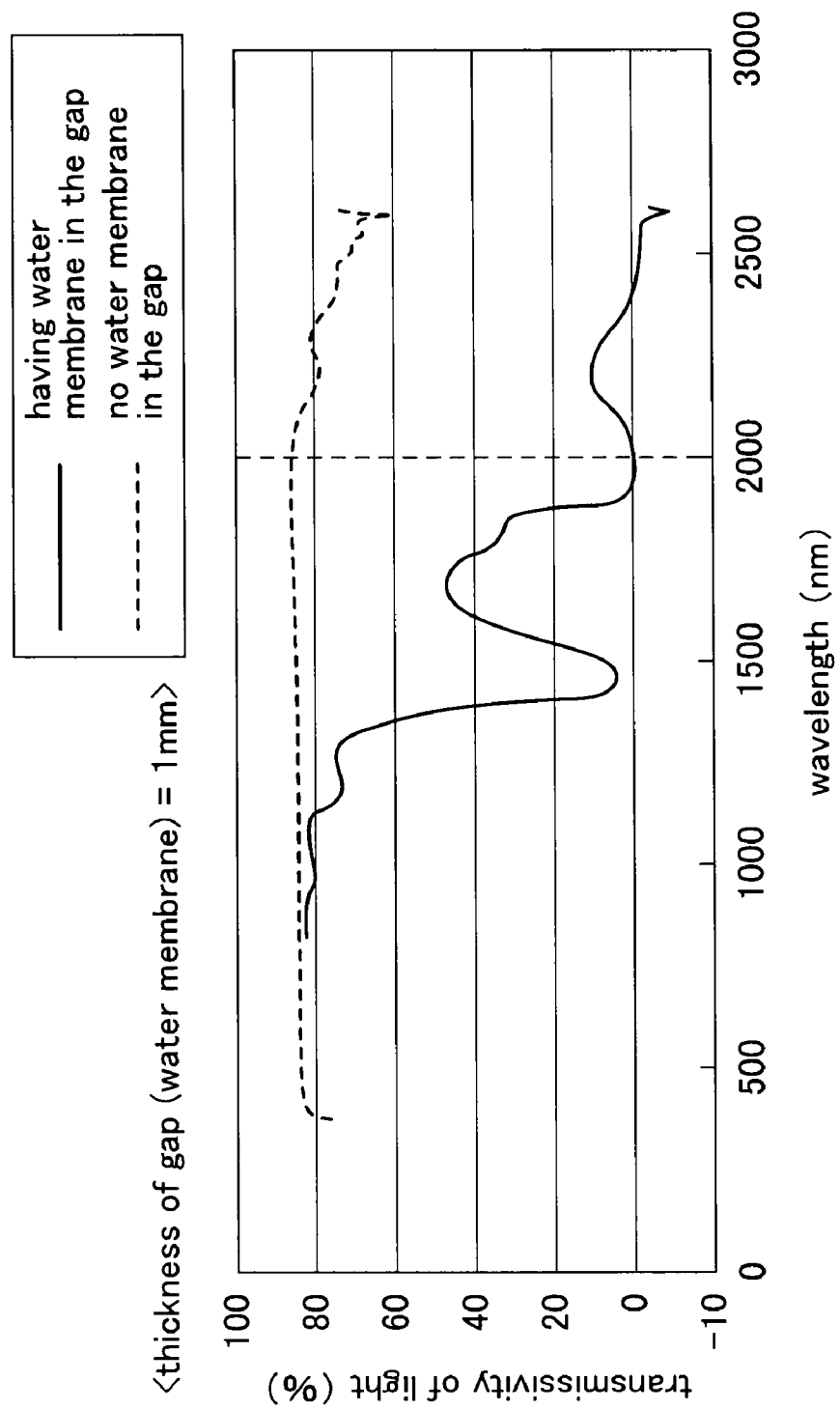
FIG. 22 is a graph showing transmissivity of light of in a filter forming a gap (water membrane) in a thickness of 1 mm, in which the wavelength (nm) is plotted on the axis of abscissas and the transmissivity (%) is plotted on the axis of ordinates, in embodiment 7.
Figure 23:
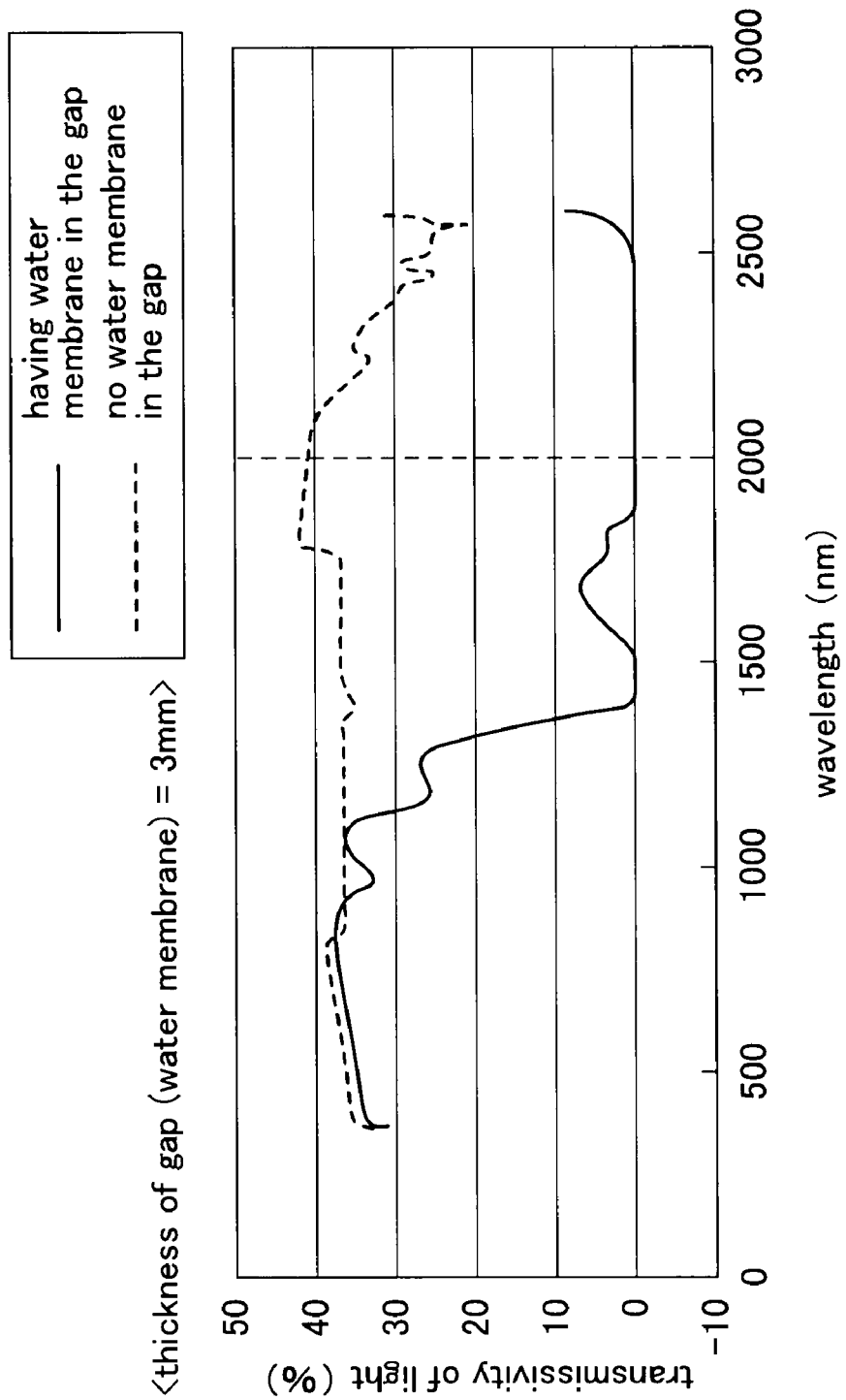
FIG. 23 is a graph showing transmissivity of light of in a filter forming a gap (water membrane) in a thickness of 3 mm, in which the wavelength (nm) is plotted on the axis of abscissas and the transmissivity (%) is plotted on the axis of ordinates, in embodiment 7.

FIG. 22 and FIG. 23 are graphs showing results of confirming absorption effects of electromagnetic waves (light) exceeding 2 μm in wavelength by the filter 5. In these diagrams, the axis of abscissas represents the wavelength (nm), and the axis of ordinates represents the light transmissivity (%), and the light transmissivity is shown about the filter 5 (solid line in the diagrams) in a state of the gap 511 between the transparent plates 51 made of glass plates filled with the filter water 52 for forming a water membrane, and the transparent plate 51 (broken line in the diagrams) before the water membrane is formed without supplying the filter water 52 in the gap 511.

FIG. 22 shows the gap 511 (water membrane) in a thickness of 1 mm, and FIG. 23 shows the gap 511 (water membrane) in a thickness of 3 mm. In the both graphs, by the transparent plates 51 of glass plates only (broken line in the graphs), the electromagnetic waves in a wide range of wavelength including the near-infrared ray (about 500 to 2500 nm) is absorbed, but by the filter 5 having the water membrane by the filter water 52, most of the electromagnetic waves exceeding about 1400 nm in wavelength may be effectively absorbed. Accordingly, by the filter 5 using the filter water 52, it is known that the electromagnetic waves (light) exceeding 2 μm in wavelength may be absorbed effectively.

Further, as shown in FIG. 23, in the case of the water membrane of 3 mm, the transmissivity of the entire light including the near-infrared ray decreases, whereas, as shown in FIG. 22, in the case of the water membrane of 1 mm, it is known that the majority of the near-infrared ray of about 1400 nm or less may be transmitted substantially. Hence, the thickness of the gap 511 formed between the pair of transparent plates 51, that is, the thickness of the water membrane by the filter water 52 is known to be about 1 mm preferably.

In the resin forming apparatus 1 of the embodiment, when filling the cavity 21 of the mold 2 with the thermoplastic resin 3, it can be filled by making use of the own gravity of the thermoplastic resin 3. Hence, large pressure is not applied to the thermoplastic resin 3, and the completed resin formed product is almost free from residual stress. Hence, the resin formed product is enhanced extremely in chemical resistance, heat resistance, and other characteristics.

It is to be noted that the pressure vessel 61 and the filter 5 may also be composed as follows.

Figure 24:
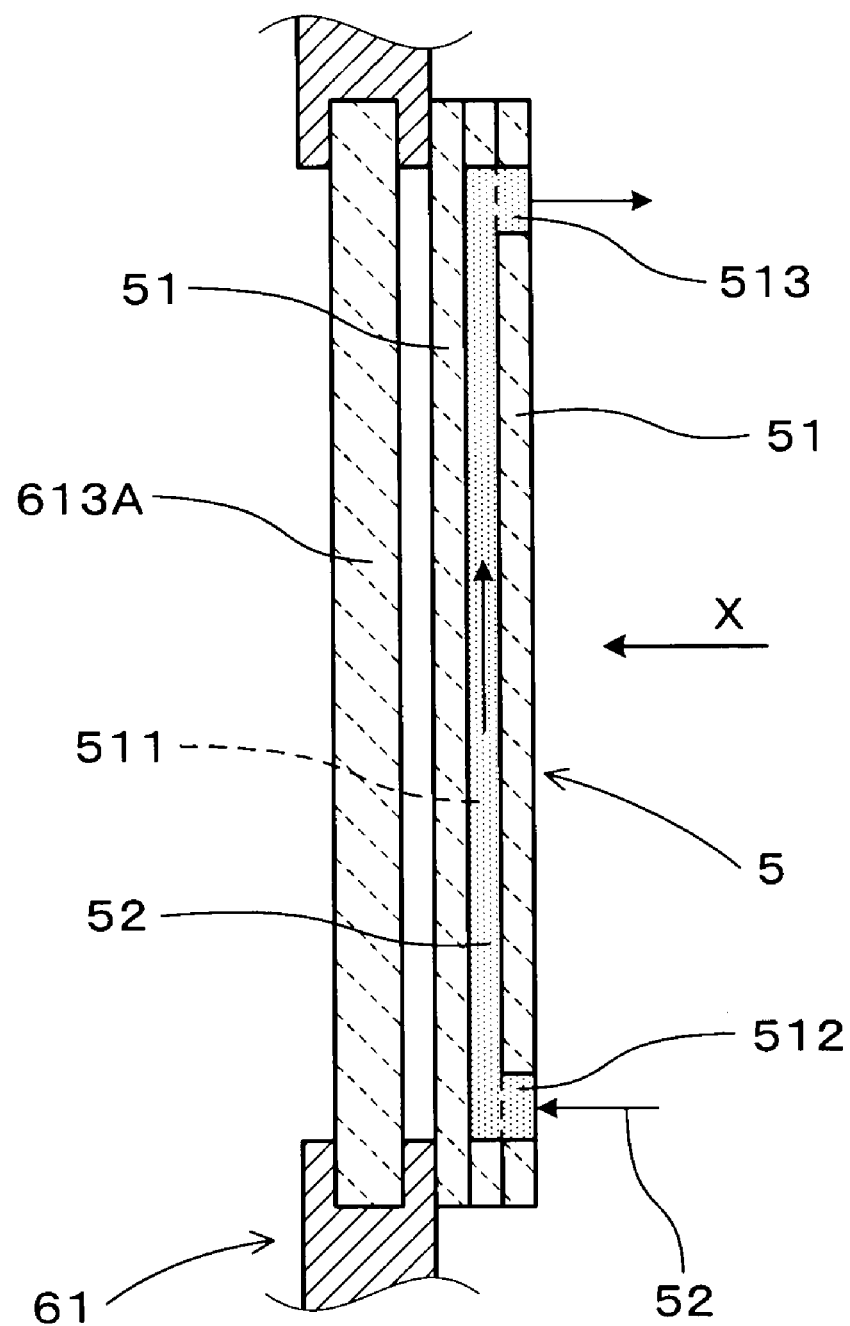
FIG. 24 is a sectional explanatory diagram of the resin forming apparatus in a filter disposed at the outer side of a container of a transparent window made of pressure-proof glass in embodiment 7.

That is, as shown in FIG. 24, in the pressure vessel 61, a transparent window 613A made of pressure-proof glass may be formed, and the filter 5 may be disposed at the outside of the container of the transparent window 613A. As the pressure-proof glass, various types of glass capable of withstanding the vacuum pressure may be used. The electromagnetic wave generating means 4 may also be composed so as to irradiate the transmission electromagnetic wave to the mold 2 through the filter 5 and the transparent window 613A. In this case, by forming the transparent window 613A of the pressure vessel 61 by using pressure-proof glass, the strength of the pressure vessel 61 may be easily maintained at high level.

What is claimed is:

1. A resin forming apparatus comprising:
   a silicone rubber mold having a cavity to be filled with a thermoplastic resin, wherein the material of the rubber mold has transmissivity for electromagnetic waves of 0.78 to 2 μm in wavelength;
   an electromagnetic wave generator, having a power consumption of at least 500 watts, for emitting electromagnetic waves of at least 0.78 μm to 4 μm, wherein waves in the range of 0.78 μm to 2 μm and waves in the range of 2 μm to 4 μm are present; and
   means for limiting the transmission amount of the emitted electromagnetic waves from said electromagnetic wave generator having a wavelength exceeding 2 μm and not for limiting the transmission amount of the emitted electromagnetic waves from said electromagnetic wave generator having a wavelength not exceeding 2 μm,
   wherein the rubber mold is positioned to be irradiated by the emitted electromagnetic waves limited by the means for limiting,
   wherein the emitted electromagnetic waves from said electromagnetic wave generator, whose transmission amount has been limited by said means for limiting, heat the thermoplastic resin more than the rubber mold and have power sufficient to maintain melted thermoplastic resin in the mold in a molten state.

2. The resin forming apparatus according to claim 1, wherein the means for limiting the intensity of electromagnetic waves comprises a filter decreasing the transmission amount of the emitted electromagnetic waves having a wavelength exceeding 2 μm disposed between the electromagnetic wave generator and the mold.

3. The resin forming apparatus according to claim 2, wherein the filter is a quartz glass capable of decreasing the transmission amount of the emitted electromagnetic waves exceeding 2 μm in wavelength.

4. The resin forming apparatus according to claim 1, further comprising:
   a pressure vessel; and
   vacuum means for evacuating the pressure vessel and cavity,
   wherein the resin forming apparatus is configured so that the emitted electromagnetic waves are irradiated to the thermoplastic resin through the mold when filling the cavity evacuated by the vacuum means with the thermoplastic resin, and wherein the pressure vessel is a sealed vessel whereby atmospheric pressure is returned therein by opening the pressure vessel.

5. The resin forming apparatus according to claim 4, wherein the mold is disposed in a pressure vessel capable of increasing and decreasing in pressure, and
   wherein the inside of the pressure vessel is configured to be decompressed to a vacuum state by the vacuum means before the thermoplastic resin is cast into the cavity, and to be pressurized over the atmospheric pressure after the cast.

6. The resin forming apparatus according to claim 4, wherein the electromagnetic wave generator has a peak wavelength of light intensity of at least 1.2 μm.

7. The resin forming apparatus according to claim 1, wherein the means for limiting the intensity of the emitted electromagnetic waves comprises a filter decreasing the transmission amount of the emitted electromagnetic waves having a wavelength exceeding 2 μm disposed between the electromagnetic wave generator and the mold.

8. The resin forming apparatus according to claim 1,
   wherein the cavity is formed in a three-dimensional space formed of a plurality of plate-like spaces crossed and coupled with each other, and each plate-like space has a plane direction forming its outline profile, and a thickness direction perpendicular to the plane direction, and
   wherein the resin forming apparatus is configured so that the electromagnetic wave generator emits electromagnetic waves to the thermoplastic resin through the mold, and also emits electromagnetic waves from an inclined direction or a perpendicular direction to the plane direction in each plate-like space, when filling the cavity with the thermoplastic resin.

9. The resin forming apparatus according to claim 8, further comprising vacuum means for vacuating the cavity, and the vacuum means configured to fill the cavity vacuated by the vacuum means with the thermoplastic resin.

10. The resin forming apparatus according to claim 1, wherein the means for limiting the intensity of electromagnetic waves comprises a filter decreasing the transmission amount of the emitted electromagnetic waves having a wavelength exceeding 2 μm disposed between the electromagnetic wave generator and the mold,
    wherein the cavity is formed in the three-dimensional space formed of the plurality of plate-like spaces crossed and coupled with each other, and each plate-like space has the plane direction forming its outline profile, and the thickness direction perpendicular to the plane direction, and
    wherein the resin forming apparatus is configured so that the electromagnetic wave generator emits transmission electromagnetic waves after passing through the filter to the thermoplastic resin through the mold, and also emits transmission electromagnetic waves from an inclined direction or a perpendicular direction to the plane direction in each plate-like space when filling the cavity with the thermoplastic resin.

11. The resin forming apparatus according to claim 1, wherein the means for limiting the intensity of electromagnetic waves comprises a filter decreasing the transmission amount of the emitted electromagnetic waves having a wavelength exceeding 2 μm,
    wherein the filter has filter water filled in a gap formed between transparent plates of a transparent material, and also includes an inlet for flowing the filter water into the gap, and an outlet for discharging the filter water from the gap,
    wherein the resin forming apparatus is configured so that the filter decreases the transmission amount of the emitted electromagnetic waves exceeding 2 μm in wavelength by the filter water, and is able to exchange the filter water through the inlet and the outlet, and wherein the resin forming apparatus is configured so that the electromagnetic wave generator emits transmission electromagnetic waves after passing through the filter to the thermoplastic resin through the mold, thereby heating the thermoplastic resin, when filling the cavity with the thermoplastic resin.

12. The resin forming apparatus according to claim 1, wherein the emitted electromagnetic waves have an intensity peak in a wavelength region of 0.78 to 2 μm.

13. The resin forming apparatus according to claim 1, wherein the thermoplastic resin before being filled into the cavity is a resin solid material formed larger than in a capacity for filling in the cavity, and wherein the resin forming apparatus has a heating and holding container for heating and holding the resin solid material, and is configured so that the semi-melted resin solid material from the heating and holding container is inserted and disposed in a resin receiving part provided in the upper part of the cavity.

14. The resin forming apparatus according to claim 13, wherein the resin solid material has a hollow shape consisting of a bottom and a side wall standing up from the bottom in an annular shape, and wherein the heating and holding container has an outer heater for heating the outer periphery of the side wall, and an inner heater for heating the inner periphery of the side wall.

15. The resin forming apparatus according to claim 1, wherein the material of the rubber mold has transmissivity as high as 90% for electromagnetic waves of 0.78 to 2 μm in wavelength.

16. The resin forming apparatus according to claim 1, wherein the electromagnetic wave generator has a peak wavelength of light intensity of at least 1.2 μm.

* * * * *